US006366771B1

(12) United States Patent
Angle et al.

(10) Patent No.: US 6,366,771 B1
(45) Date of Patent: Apr. 2, 2002

(54) WIRELESS COMMUNICATION NETWORK HAVING VOICE AND DATA COMMUNICATION CAPABILITY

(76) Inventors: Arron S. Angle, 31 Pale Dawn Pl.; Timothy P. O'Hagan, 31 White Bark Pl., both of The Woodlands, TX (US) 77381

(*) Notice: Subject to any disclaimer, the term of this patent is extended or adjusted under 35 U.S.C. 154(b) by 0 days.

(21) Appl. No.: 09/082,741

(22) Filed: May 21, 1998

Related U.S. Application Data

(63) Continuation-in-part of application No. 08/867,076, filed on Jun. 2, 1997, which is a continuation-in-part of application No. 08/493,480, filed on Jun. 21, 1995, now abandoned.

(51) Int. Cl.[7] ................................................ H04B 7/00
(52) U.S. Cl. ...................... 455/414; 455/550; 455/564
(58) Field of Search .............................. 455/31.1, 31.2, 455/31.3, 412, 414, 415, 38.1, 550, 564, 566, 569, 575, 90

(56) References Cited

U.S. PATENT DOCUMENTS 5,778,314 A * 7/1998 Sudo ......................... 455/564

OTHER PUBLICATIONS

Symbol Technologies, Inc., Symbol Technologies Announces Wireless LAN Telephone System, Jan. 19, 1998, pages 2.

* cited by examiner

*Primary Examiner*—Thanh Cong Le

(57) ABSTRACT

A wireless network including a backbone and a plurality of access points coupled to the backbone. The wireless network further includes a plurality of portable data terminals having a keypad, a barcode reader, and voice communication circuitry. The portable data terminals also include an RF transceiver for wirelessly communicating both data and audio communication with the backbone via one of the plurality of access points. The wireless network includes a host computer coupled to the backbone which receives at least a portion of the data transmitted from the plurality of portable data terminals and a gateway coupled to the backbone which receives at least a portion of the audio communication transmitted from the plurality of portable data terminals. The gateway further serves to establish a pseudo full duplex audio communication link between the plurality of portable data terminals and/or between a portable data terminal and a device coupled to a public telephone exchange via a PBX interface.

24 Claims, 18 Drawing Sheets

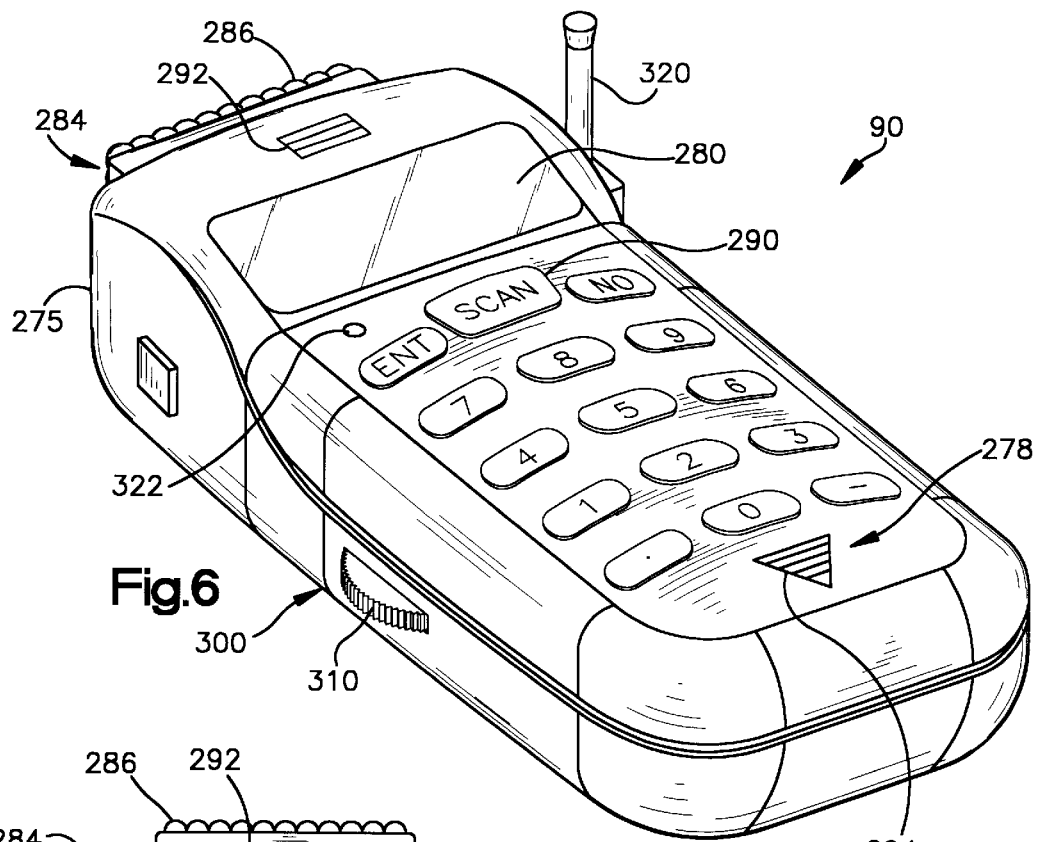
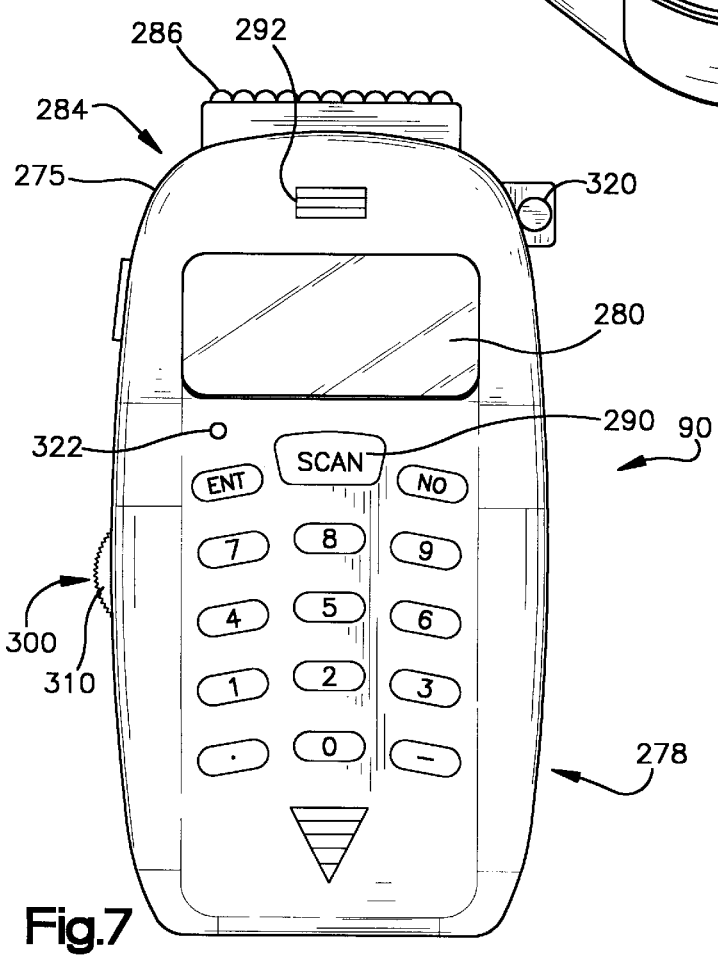
Fig.6
Fig.7

WIRELESS COMMUNICATION NETWORK HAVING VOICE AND DATA COMMUNICATION CAPABILITY

CROSS REFERENCE TO RELATED APPLICATIONS

This application is a continuation-in-part of copending application Ser. No. 08/867,076, filed on Jun. 2, 1997, which is a continuation-in-part of application Ser. No. 08/493,480, filed Jun. 21, 1995 now abandoned.

TECHNICAL FIELD

The present invention relates generally to wireless networks, and more specifically to wireless networks including one or more portable data terminals.

BACKGROUND OF THE INVENTION

In many industries portable data terminals are used to gather data from remote locations and relay such data to a central computing device. Usually the applications for such devices are for tracking the location and quantity of goods as they are moved throughout a manufacturing, distribution, warehouse, or retail facility, for example. Typical devices used in such applications include portable data terminals or portable pen computing devices. In a batch data collection application, an operator will take a terminal into the facility and input data at various remote locations. The data may be hand input via a keypad or it may be electronically input through a barcode reader. When the operator has completed all of the data collection tasks, the operator transports the terminal to a docking station where, once connected, data is uploaded from the terminal a host computer.

In a wireless network, or RF data collection network, each portable data terminal includes an RF transceiver which transmits data to the host computing device within a very short period of time after the data is input into the terminal. If the data collection area is small, the RF transceiver may communicate directly with a corresponding RF transceiver at the host computer. If the facility is larger, the portable terminal transceiver may communicate with one of a plurality of access point transceivers geographically spaced throughout the facility. The access points in turn communicates with the host computer through a hardwired network such as Token Ring or Ethernet.

A problem associated with such data collection systems is that there is not a convenient system for voice communication among each person operating a data collection terminal and/or central managers. While it has been possible in the past to communicate data information to another terminal or host computer via a keypad, barcode reader, or the like, it is desirable to provide for voice communication as well. For example, a person operating a terminal at one location in a facility may want to engage in conversation and/or leave a voice mail message with another person operating a terminal at a different location.

Cellular telephones have been available which provide for wireless voice communications. However, such technology requires its own dedicated communications network. Hence, it would be expensive and perhaps cost prohibitive to simply add a cellular telephone to a data collection terminal to permit voice communications through the terminal. This would require separate RF transceivers, access to commercial cellular service providers, etc., each of which would significantly add to the cost of owning and operating such a terminal.

Accordingly, there is a strong need in the art for a portable data collection network which includes portable data terminals which provide for voice communication. In particular, there is a strong need for a network in which the terminals do not require a separate RF transceiver or access to commercial cellular service providers. There is a strong need for a network which permits voice communication over the same network links utilized for data communications.

SUMMARY OF THE INVENTION

A wireless network includes a backbone and a plurality of access points coupled to the backbone. A plurality of portable data terminals wirelessly communicate with the backbone via a selected one of the plurality of access points. At least one of the plurality of portable data terminals is configured to be able to transmit and receive both data and voice communication.

In order to effectuate the exchange of voice communications between two portable data terminals or between a portable data terminal and a traditional telephone coupled to a PBX, a pseudo full duplex audio communication gateway is provided on the backbone. All audio communication transmitted and received by the portable data terminal is routed through the gateway. Advantageously, the gateway is able to enhance audio communication speeds over the backbone by serving as a dedicated audio communication routing device. Further, the gateway serves to keep track of all portable devices currently engaged in an active telephonic session with another device in order to ensure that these telephonic sessions are not disrupted by requests from other devices to enter a new telephonic session. It will also be appreciated, that by use of pseudo full duplex audio communication via the gateway, each mobile terminal currently in a telephonic session may concurrently transmit and/or receive data from a host computer or other network device.

According to one aspect of the invention, a wireless network including a backbone and a plurality of access points coupled to the backbone is provided. The wireless network includes a plurality of portable data terminals. The portable data terminals each include a processor; at least one of a keypad and a barcode reader coupled to the processor for entry of data; an audio communication circuit coupled to the processor for converting audio communication between an analog and digital format; and an RF transceiver for wirelessly communicating the data and the audio communication with the backbone via one of the plurality of access points. The wireless network further includes a host computer coupled to the backbone and receiving at least a portion of the data from the plurality of portable data terminals; and a gateway coupled to the backbone and receiving at least a portion of the audio communication. The gateway further serves to establishing a pseudo full duplex audio communication link between the plurality of portable data terminals.

According to a more limited aspect of the present invention, the gateway further includes a PBX interface for interfacing a portable data terminal with a traditional telephone device communicating via a PBX.

According to another aspect of the invention, a portable data terminal is provided for use in a wireless network. The wireless network includes a backbone, a plurality of access points coupled to the backbone, a host computer coupled to the backbone for communicating data with the portable data terminal via a selected one of the plurality of access points, and a pseudo full duplex audio communication gateway coupled to the backbone for communicating audio communication with the portable data terminal via a selected one of the plurality of access points. The portable data terminal includes a keypad providing for entry of a destination code representative of a destination device with which the portable data terminal desires to establish a pseudo full duplex audio communication link via the pseudo full duplex audio communication gateway and for providing entry of data for processing by the host computer; a processor coupled to the keypad, the processor operative to distinguish between keypad entries representative of the destination code for transmission to the pseudo full duplex audio communication gateway and keypad entries representative of the data for transmission to the host computer; and an RF transceiver wirelessly communicating the data to the host computer and the destination code to the pseudo full duplex audio communication gateway in accordance with instructions from the processor.

According to still another aspect of the present invention, a method is provided for a wireless communication network including a backbone, a plurality of access points coupled to the backbone, a pseudo full duplex audio communication gateway coupled to the backbone, and a first and second portable data terminal communicating with a host computer coupled to the backbone via a selected one of the plurality of access points. The method includes the steps of establishing an active telephonic session between the first and second terminals via the pseudo full duplex audio communication gateway, and transmitting data from at least one of the first and second terminals to host computer during the active telephonic session.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 6 is a perspective view of a data collection terminal having voice messaging audio communication capabilities in accordance with the present invention.

FIG. 7 is a front plan view of a data collection terminal having voice messaging audio communication capabilities in accordance with the present invention.

DESCRIPTION OF THE PREFERRED EMBODIMENTS

Figure 1:
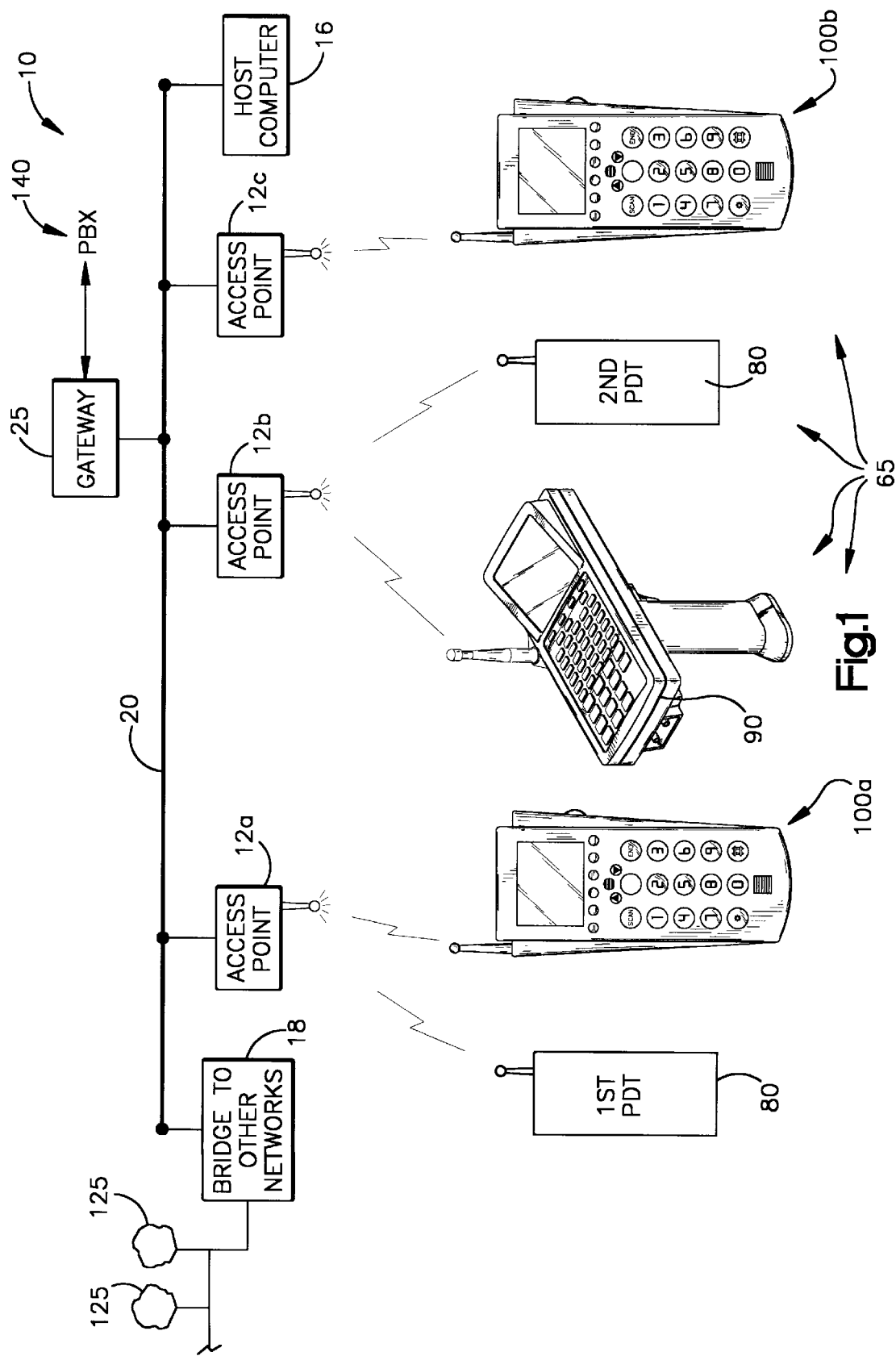
FIG. 1 is a block diagram of a portable data collection network in accordance with the present invention.

The present invention will now be described in detail with reference to the drawings. In the drawings, like reference numerals are used to refer to like elements throughout.

FIG. 1 shows a block diagram of a wireless network 10 which would be installed at a factory, warehouse, store or other facility where barcodes are used to track the movement of commodities throughout the facility. A backbone network 20 communicatively interconnects a plurality of radiofrequency (RF) access points represented by 12a, 12b and 12c (collectively referred to as access points 12) and other computing devices including an application host computer 16, a bridge to other networks 18, and a voice communication gateway 25. The backbone network 20 typically communicates data using an industry standard protocol such as Ethernet or Token Ring.

Figure 2:
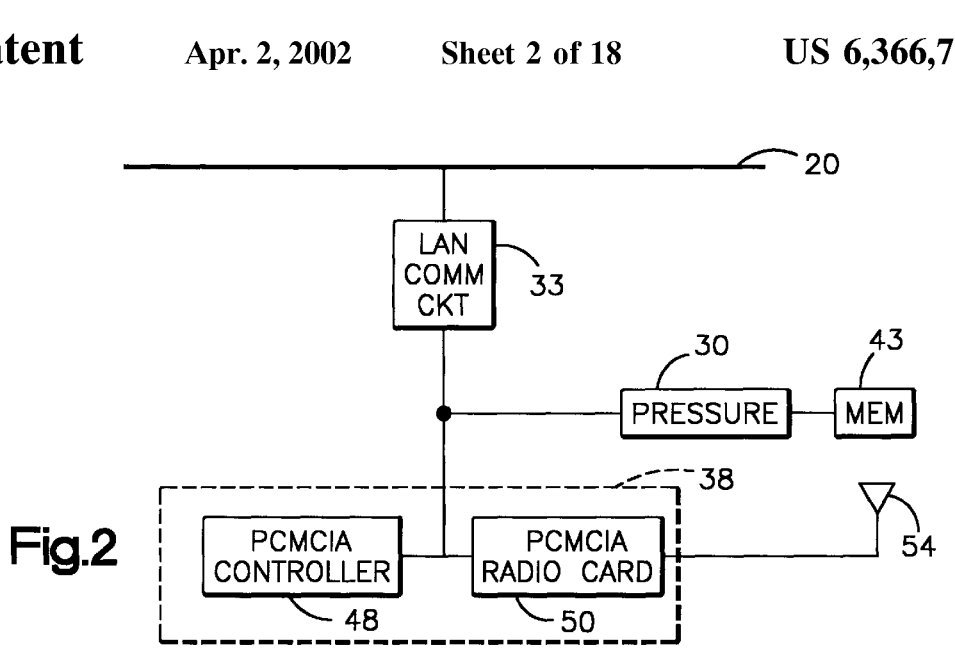
FIG. 2 is a block diagram of an access point in accordance with the present invention.

Referring to FIG. 2, each access point 12, is coupled to the backbone network 20 via a standard network connector. A processor 30 generally controls operation of the access point 12. In the preferred embodiment, an ISA bus interconnects the processor 30 LAN communication circuitry 33 and RF communication circuitry 38, however, other bus structures could be used. The LAN communication circuitry 33 is preferably a commonly available ISA peripheral Ethernet or TokenRing chip set. An appropriate software driver for interchanging data between the processor 30 and the LAN communication circuitry 33 is loaded into memory 43 and executed by processor 30. In the preferred embodiment, the RF communication circuitry 38 includes a commonly available ISA peripheral PCMCIA controller 48 and a PCMCIA data radio 50 operating in accordance with the IEEE 802.11 RF communication protocol. An antenna 54 connects to the radio 50 and propagates the transmitted signal for communicated data from the radio 50 to mobile RF devices 65 and captures propagated signals transmitted by the mobile RF devices 65 (FIG. 1).

Referring again to FIG. 1, a plurality of mobile RF devices 65 operate within the wireless network 10 and communicate via RF transmissions to one of the access points 12 when the RF device 65 is within a region of RF communication coverage of an access point 12 such that the RF communications between the access point 12 and the RF device 65 are relatively error-free. The RF transmission are preferably in accordance with the IEEE 802.11 protocol. In the preferred embodiment, three categories of RF devices 65 operate within the wireless network 10. The first category of devices are RF data terminals 80, the second category of devices are RF data terminals with voice messaging capabilities 90, and the third category of devices are network telephones 100. Each of these devices will be described in more detail below.

The bridge 18 to other networks is communicatively coupled to the backbone network 20 such that data may be communicated to or from. a plurality of other networks 125 coupled to the bridge 18. It will be appreciated that this architecture enables any portable RF device 65 to communicate data with remote devices (not shown) which are not on backbone network 20, but are communicatively coupled to backbone network 20 via bridge 18.

The a host computer 16 operates a data collection and tracking application (or other application) that is useful for tracking the movement of commodities through the facility. Information related to the commodities is sent from the portable RF devices 65 to the host computer 16 and data useful to the operator of a portable RF device 65 is sent from the application host computer 16 to the portable RF device 65.

Figure 3:
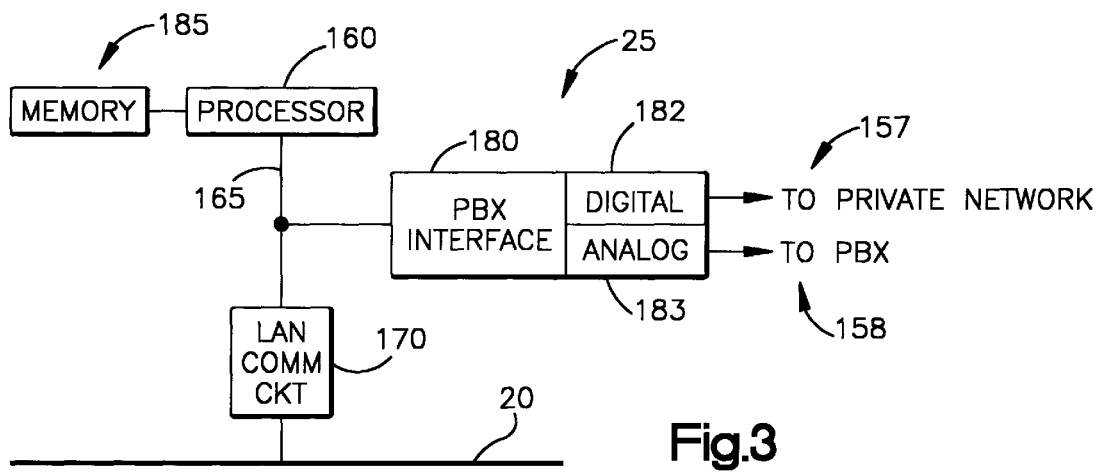
FIG. 3 is block diagram of a gateway in accordance with the present invention.

The gateway 25 facilitates pseudo full duplex communication between portable network telephones 100 and between a portable network telephone 100 and a standard analog or digital telephone coupled to the gateway 25 via a proprietary telephone network 157 or a subscriber loop 158 to a public network (PBX) 140. The gateway 25 is shown in more detail in FIG. 3. A processor 160 generally controls operation of the gateway 25. In the preferred embodiment, an ISA bus 16 interconnects the processor 290 with LAN communication circuitry 170 and PBX interface circuitry 180, however, other bus structures could be used. Like the access points 12, the LAN communication circuitry 170 is preferably a commonly available ISA peripheral Ethernet or TokenRing chip set and an appropriate software driver for interchanging data between the processor 160 and the LAN communication circuitry 170 is loaded into memory 183 and executed by processor 160. The PBX interface circuitry 180 includes digital and analog interfaces 182, 183, respectively, and operates to send and receive telephone calls over the proprietary digital telephone network 182 and over the subscriber loop to the PBX 158. Circuitry for interfacing and communicating with the proprietary digital telephone network and PBX is commonly available from companies such as AT&T and Ericsson. Again, an appropriate software driver for communicating with the PBX interface circuitry 180 is loaded into the memory 185 and operated by the processor 160.

Portable RF Data Terminals

Figure 4:
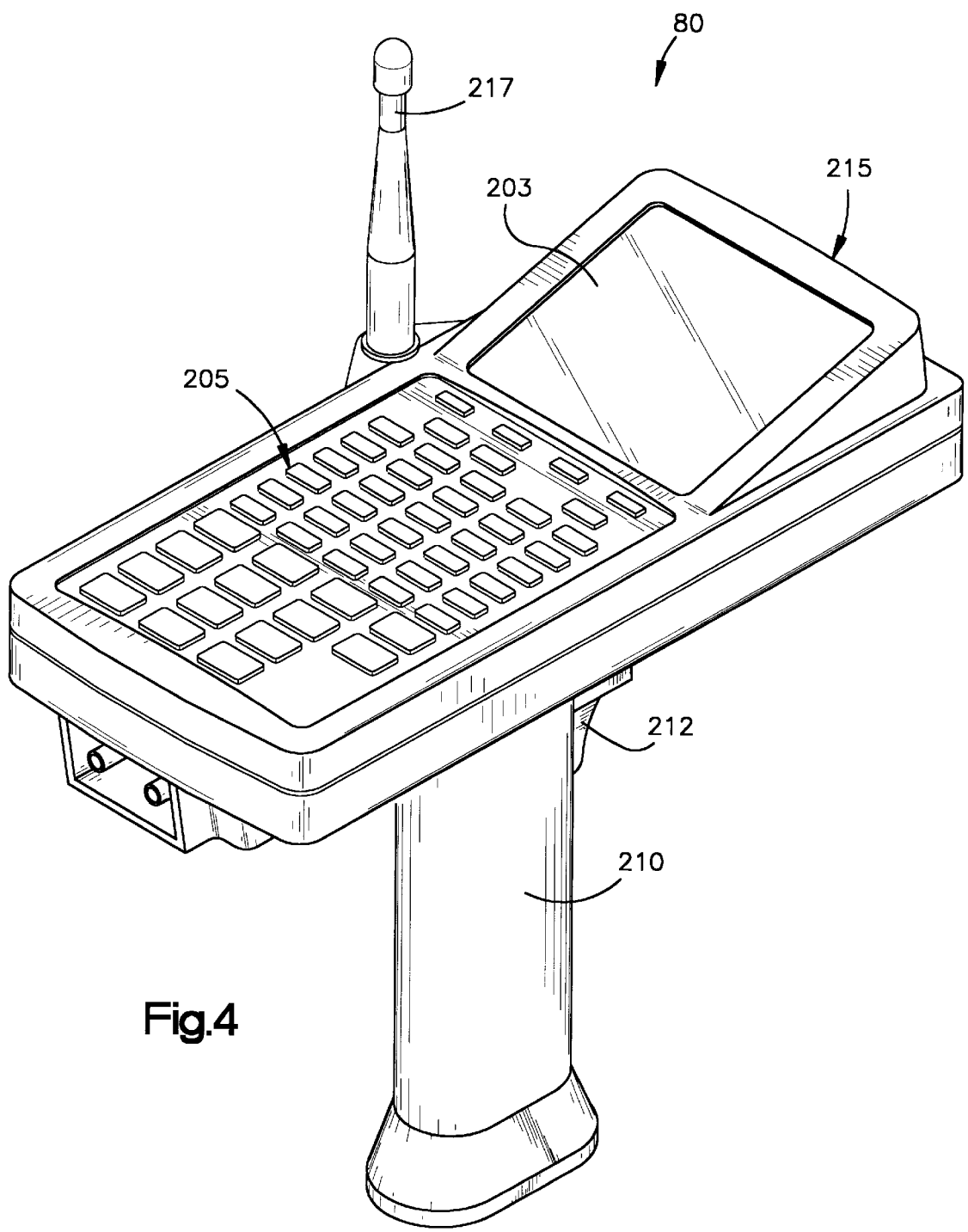
FIG. 4 is a perspective view of a data collection terminal in accordance with the present invention.

FIG. 4 shows a perspective view of the first category of devices, portable RF data terminals 80. In the present embodiment the RF data terminal 80 is shown to be a portable bar code reader, however, it will be appreciated that the portable RF data terminals 80 may be one or more of a variety of other known devices including portable pen based computers, wireless pagers, etc. As best seen in FIG. 4, the RF data terminal 80 includes a portable housing 200, having a display screen 203 and a plurality of user interface keys 205 disposed therein. The RF data terminal further includes a handle 210 and a trigger 212 for initiating a bar code read operation. A bar code read window 215 is disposed on a front face of the housing and provides a window through which signals may travel for reading a bar code or other indicia. An antenna 217 is pivotally coupled to the housing 200 and allows for the receipt and transmission of wireless RF communication.

Figure 5:
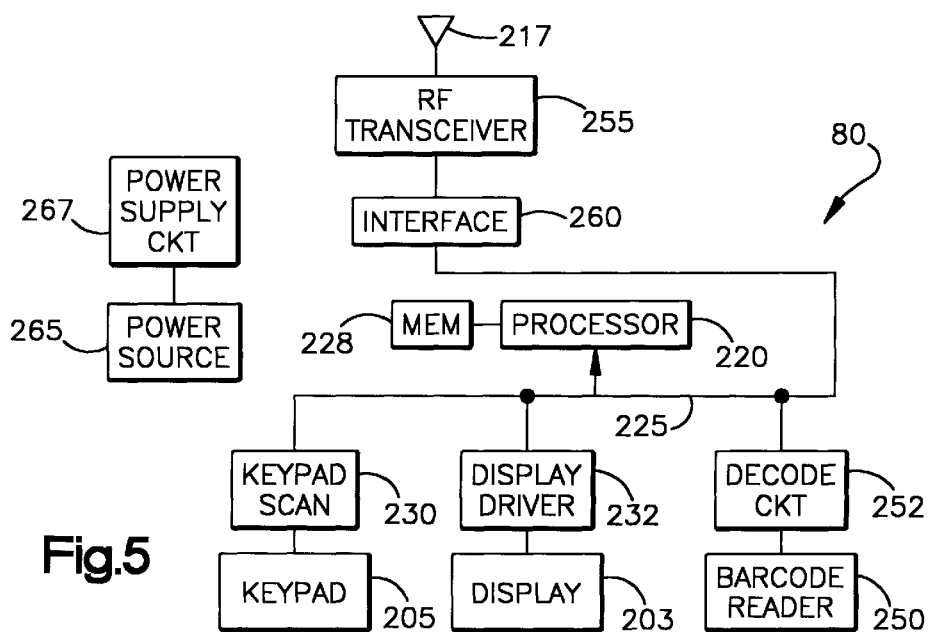
FIG. 5 is a block diagram of the data collection terminal in accordance with the present invention.

Referring now to FIG. 5, a block diagram of the electronic components of the RF data terminal 80 is shown in more detail. A processor 220 is coupled to a bus 225 such as an ISA bus or other conventional bus for carrying out the operations of the RF data terminal 80. A memory 228 coupled to the processor 220 via the bus 225 serves to store programs, data, and other information utilized during the operation of the RF data terminal 80. A keypad scan circuit 230 coupled to the bus 225 serves to scan the keypad 205 to determine when an entry has been made by an operator and to send a corresponding signal to the processor 220. The display 203 is coupled to the bus 225 via a display driver circuitry 232 and activates and deactivates the appropriate pixels in the display 203 to produce the desired message. A bar coder reader 250 is disposed in the housing behind the bar code read window 215 and is coupled to the bus 225 via decode circuitry 252. In order to wirelessly communicate information with other devices in the network 10, the RF data terminal further includes an RF transceiver 255 which is coupled to the bus 225 via interface 260. The interface 260 may, for example, be a PCMCIA interface or other suitable interface as is known in the art. The RF data terminal 80 is powered via power source 265 which provides power to the RF data terminal 80 from a battery or from an external power source through an AC adapter or docking station, for example. The power is then appropriately distributed to the components of the RF data terminal 80 through power supply circuit 267.

FIGS. 6 and 7 respectively show a perspective view and a top view of a portable RF data terminal 90 with voice messaging respectively. The terminal 90 includes a housing 275 preferably constructed of a suitable impact resistant plastic which is both durable and lightweight. A keypad 278 is exposed on the housing 275 enabling an operator to manually input data and to control various terminal functions as is conventional. For example, operator may enter quantity information via numeric keys 0–9 included in the keypad 278. The terminal 14 also includes a liquid crystal display (LCD) 280 capable of displaying several lines of alphanumeric characters as well as graphics relating to the operation of the terminal 90. In addition, the display 280 may function as a touch panel display to allow the input of information in addition to or in place of the keypad 278.

A barcode reader 284 and an illuminator module 286 located at an upper end of the housing 275 provide for convenient reading of a barcode symbol. A detailed description of an exemplary barcode reader 284, illuminator module 286, and associated optics and electronics can be found in the aforementioned application Ser. No. 08/493,480, the entire disclosure of which is incorporated herein by reference. A read button 290 included in the keypad 278 is used by the operator to activate the barcode reader 284 and to initiate a barcode reading session. It will be appreciated that information which is input to the terminal 90 via the barcode reader 284 and/or the keypad 278 may be stored and subsequently transmitted to other devices communicatively coupled to the wireless network 10 (FIG. 1).

A grated speaker aperture 292, covering a speaker 293 (FIG. 8), is positioned forward of the display screen 280 at the upper end of the housing 275. In addition, a grated microphone aperture 294, behind which a microphone 298 (FIG. 8) is located, is positioned at a lower end of the housing 275 below the keyboard 278. The spacing between the speaker aperture 36 and the microphone aperture 292 is such that the speaker 293 will be positioned near the operator's ear, and the microphone 298 will be positioned near the operator's mouth when an operator holds the terminal 90 with the keypad 278 and display 280 adjacent his or her cheek. When held in this position, the operator is able to verbally communicate as if the terminal 90 were a telephone handset as is described more fully below.

Exposed on the left side of the housing 275 is a three-way switch 300 which is used by an operator to select among different functions in association with sending and receiving voice messages with the terminal 90 in accordance with the invention. In the exemplary embodiment, the switch 300 includes a thumb wheel 310 that may be rotated continuously in either a clockwise or counterclockwise direction which, as discussed below, functions to scroll a cursor up or down on the display screen respectively. Furthermore, the thumb wheel 310 may be depressed in a transaxial direction to function as a select button or a "push-to-talk" button. For example, the thumb wheel 310 may be used to select a recipient of a voice message from a list of commonly messaged destinations and may be used as part of a "push-to-talk" function for entering the voice message.

An exemplary switch 300 suitable for use in accordance with the invention is described in commonly assigned U.S. application Ser. No. 08/726,030, entitled "Programmable Mobile Device with Thumb Wheel", filed on Oct. 4, 1996. The entire disclosure of application Ser. No. 08/726,030 is incorporated herein by reference. However, it is understood that any suitable switch or combination of switches for performing the functions described herein can be employed for purposes of this invention.

The terminal 90 further includes RF communication circuitry 315 (FIG. 8) capable of communicating with an access point 12 using the IEEE 802.11 protocol. An antenna 320 functions to propagate RF transmissions and collect transmissions propagated by the access point 12 as will be appreciated.

A light emitting diode (LED) 322 indicates receipt of one or more voice messages or an incoming call. Although an LED 322 is used in a preferred embodiment, it will be appreciated that other types of display elements could be used without departing from the scope of the invention.

Figure 8:
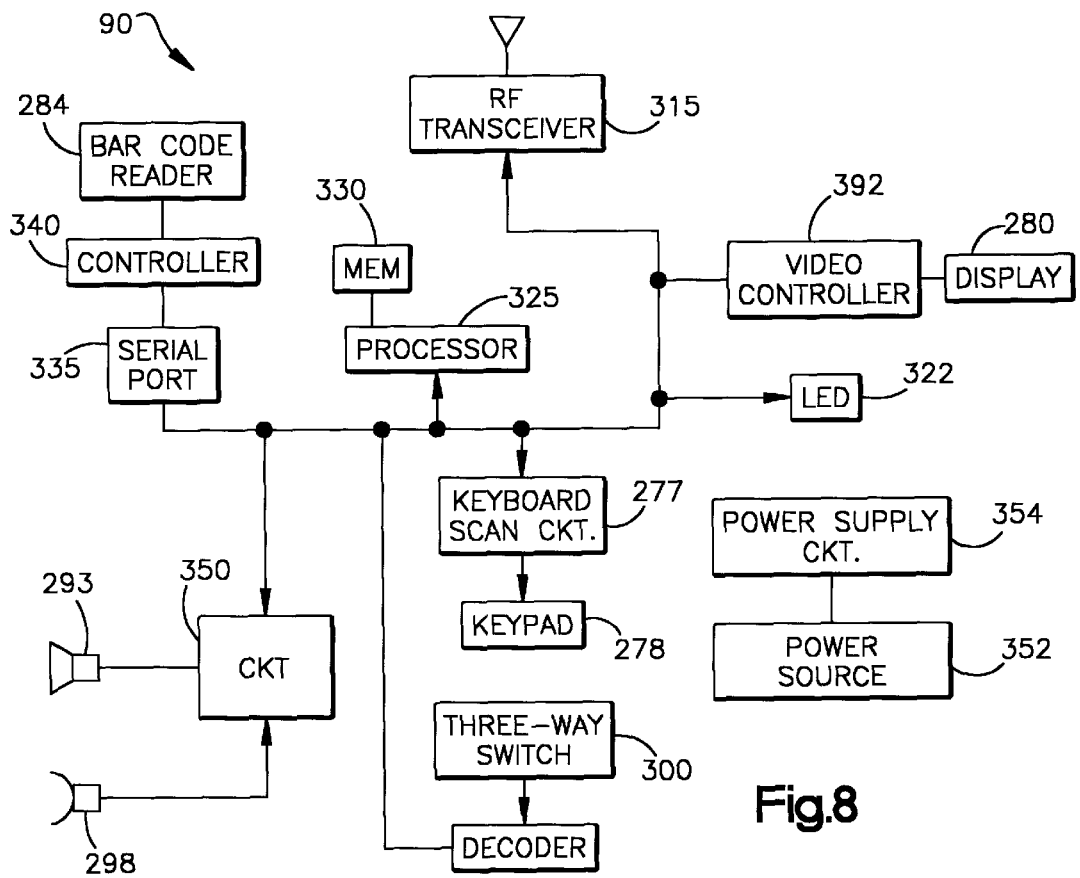
FIG. 8 is a block diagram of the internal electronics of a data collection terminal having voice message audio communication capabilities in accordance with the present invention.

Referring now to FIG. 8, a block diagram is shown representing the electronic circuitry contained within the housing 275 of the terminal 90 with voice messaging. A processor 325 operating in accordance with software programs stored in memory 330 generally controls the various components within the terminal 90 in order to carry out the various functions described herein. The processor 325 may be, for example, an Intel 80486 or similar type microprocessor. The memory 330 stores an appropriate operating system and a data collection application program useful for operating in conjunctions with the application host for carrying out the intended operation of the terminal within the facility. The memory 330 also stores a voice messaging program useful for carrying out the voice messaging functions of the terminal 90 as is discussed in more detail below. Additionally, the memory 330 stores the various drivers for operating the various peripherals as is commonly known. A bus 332 serves to communicate various control and data information between the components within the terminal 90 using conventional techniques.

A microcontroller 277 is configured to scan the keypad 278 and monitors when a keyswitch (e.g. numeric keys 1–9) is depressed. Using conventional interrupt techniques corresponding keyswitch data is passed to the processor 325. The keyswitch data may be used by either the application program or the voice messaging program as appropriate.

A UART serial port input/output circuit 335 is also coupled to the processor 325 via the bus 332. In turn, a microcontroller 340 for controlling the barcode reader and decoding barcodes is coupled to the serial port 335 enabling a decoded representation of a barcode to be coupled to the processor 325 as is conventional. Typically, the data collection application will be configured to initiate a transmission of the decoded data to the host computer 16.

A video controller 342 circuit is also coupled to the processor 325 via the bus 332 and operates the display 280 in a conventional manner. The image contents on the display 280 is generally controlled by the data collection application stored in memory 330 when the terminal is in the data collection mode and by the voice messaging application stored in memory 330 when in the voice messaging mode. However, a window for each application could be displayed simultaneously if the display 280 is large enough for each window to be legible to the operator.

An audio controller circuit 350 is coupled to the processor 325 via the bus 332 and functions to operate the speaker 293 and microphone 293. The audio controller circuit 350 digitizes and compresses audio information collected from the microphone and passes such digital audio data to the processor (or directly to the memory using DMA) via the bus 332 as is conventional. Additionally the audio controller circuit 350 decompresses digital audio data and converts such data to a signal to be played on the speaker 293 as is conventional. Generally, the audio controller 350 circuit operates in conjunction with the voice messaging application and is deactivated when a terminal is not in a voice mode to conserve power.

The terminal 90 also includes a power source 352 such as a lithium ion battery which provides power to a power supply circuit 354. The power supply circuit 354 regulates the output of the power source 352 and provides operating power to the various components within the terminal 90. The power supply circuit 354 also functions to regulate recharging of the power source 352 in the case where the power source 352 is a rechargeable supply.

Figure 9:
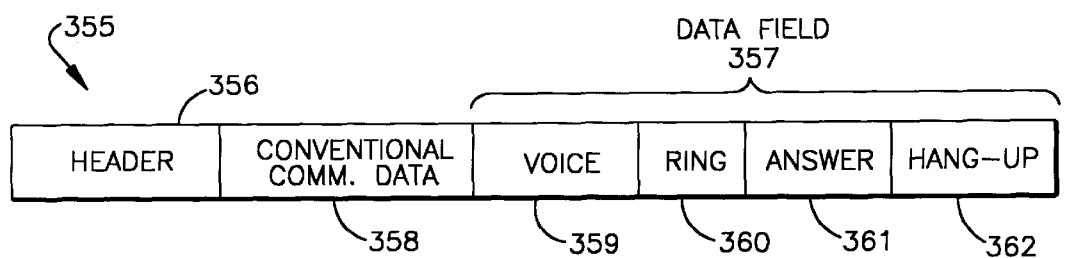
FIG. 9 is an exemplary packet format for transmitting audio communication in accordance with one embodiment of the invention.

FIG. 9 shows the general format for digital information packets 355 produced by the terminal 90 in accordance with present embodiment. As is conventional, the packet 355 may be divided into smaller frames which are wirelessly transmitted across the various layers (e.g. physical layer, medium access layer, etc.) of the wireless network 10 using industry standard protocols as is known in the art. The packet 355 is made up of a header field 356 and a data field 357. As is conventional, the header field 357 typically includes information such as the network address of the device 90 sending the packet (i.e., the source address), and the network address of the device 90 intended to receive the packet 355 (i.e., the destination address). The data field 357, during conventional operation of the terminal 90 as a data terminal, includes a field 358 containing conventional data such as inventory data and the like. In addition, however, the data field 357 may include a voice field 359 containing compressed digitized voice data to be transmitted to the receiving device as described below. Furthermore, when a terminal 90 attempts to initiate a voice messaging conversation in state 410 (FIG. 10), the terminal 90 includes in a packet 130 a "ring" field indicator 360 to indicate to the receiving device the desire to establish a conversation.

When a terminal 90 wants to "answer" a conversation request initiated by another device, the terminal 90 transmits a packet 355 to the requesting device including an "answer" field indicator 361. Finally, if a terminal 90 wants to terminate an established or attempted conversation, the terminal 90 includes a "hang-up" field indicator 362.

It will be appreciated that each terminal 90 (and other devices in the network 10 intended to participate in voice mail, or voice messaging conversation functions using push to talk is programmed to include and detect the voice field 359, ring field indicator 360, answer field indicator 361 and hang-up field indicator 362 in the information packets 355. It is not necessary that all field indicators be in each packet, only that the field indicators be included at the appropriate time for carrying out the intended function as discussed below.

Voice Messaging Application

Figure 10:
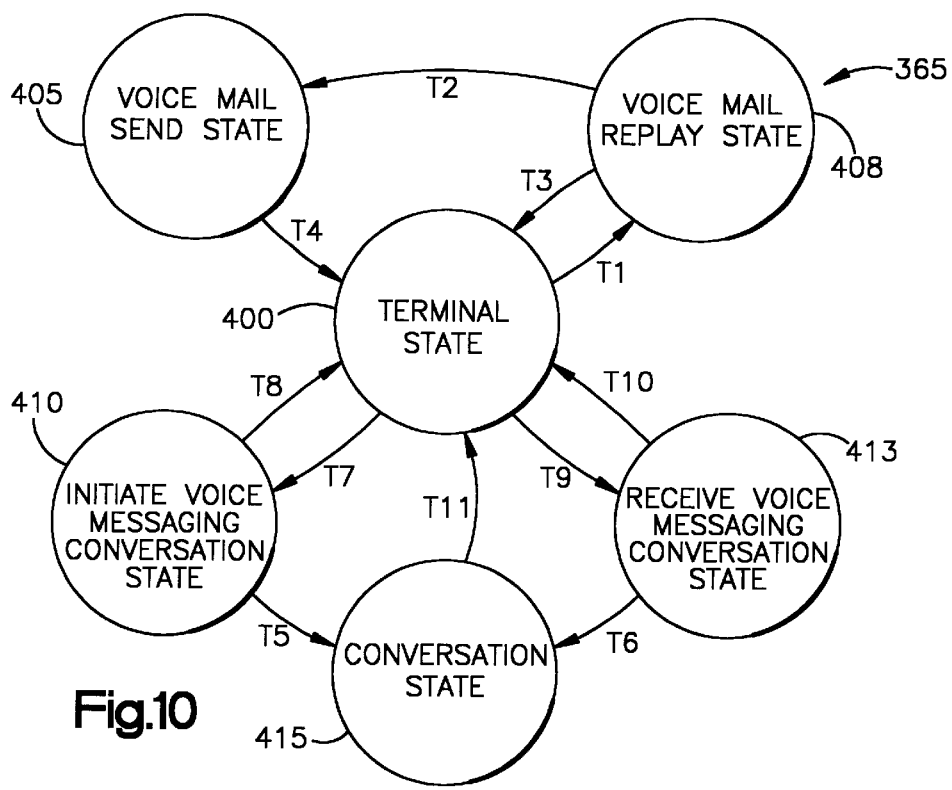
FIG. 10 is a state diagram indicating the various states of operation of a data collection terminal having voice message capabilities in accordance with the present invention.

FIG. 10 shows a state machine 365 showing the operations of the terminal 90. A terminal state 400 represents operation of the terminal 90 as generally controlled by the data collection application. Various audio communication states such as voice mail send state 405, voice mail reply state 408, initiate voice messaging conversation state 410, receive voice messaging request state 413, and conversation state 415 represent states of operation as generally controlled by the voice messaging application. Each of these states will be described in more detail below with respect to FIGS. 11–17.

Figure 11:
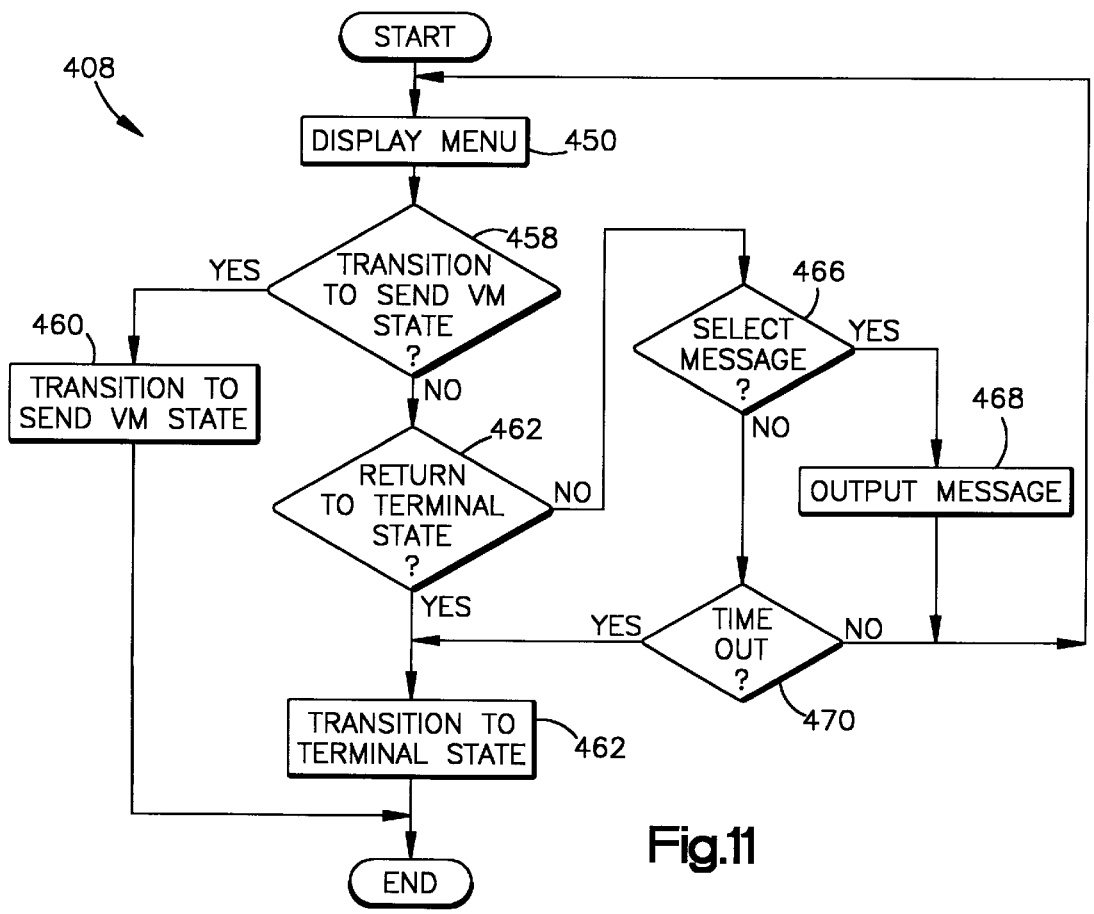
FIG. 11 is a flowchart illustrating the operation of the portable data terminal having voice messaging capabilities in a voice mail replay state.

FIG. 11 shows a flow chart of operation of the terminal 90 in the voice mail replay state 408 wherein the operator would replay voice mail messages sent by others to the terminal 90 and stored in the memory. As previously discussed, a LED 322 illuminates when voice mail messages are stored for the operator of the terminal 90. The operator selects to transition from the terminal state 400 to the voice mail reply state 408 by an appropriate key selection via keypad 278.

Figure 12:
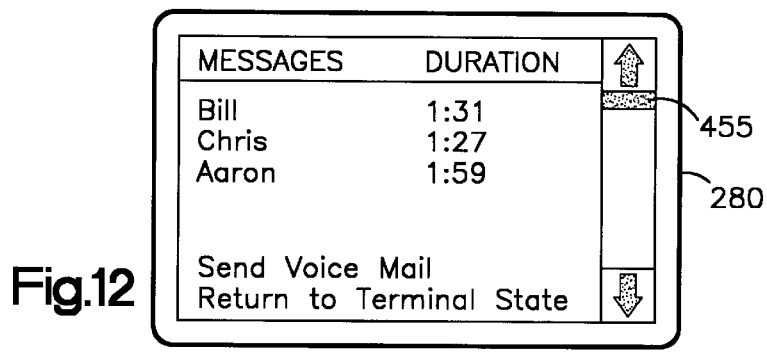
FIG. 12 is an exemplary menu provided on a display of the portable data terminal when in a voice replay state in accordance with the present invention.

At step 450 the replay menu shown in FIG. 12 is displayed on the display screen 280. The menu displays the "nickname" and time duration of voice mail messages which have been received by the terminal 90 and stored in the memory 330. Again, the system is programmed such that rotational movement of the switch 300 causes a cursor 455 to move up and down in relation to the displayed messages. The operator may select a voice mail message to be played by depressing the switch 300 transaxially while the cursor 455 is adjacent thereto. The menu also includes selections for transitioning to the voice mail send state 405 via transition T2 and transitioning back to the terminal state 400 via transition T3 (FIG. 10).

If at step 458 the operator selects to transition to the voice mail send state 405, the transition occurs at step 460. If at step 462 the operator selects to transition to the terminal state 400, the transition occurs at step 464. If at step 466 the operator selects a message for replay, the program advances to step 468 which represents replay. At step 468, the voice messaging program selects the appropriate digital data representing the message from memory 330 and passes that data to the audio controller circuit 350 via the bus 332 and the audio controller circuit 350 plays the message on the speaker 293. The operator can then select to save the message, delete the message, answer the message, or forward the message as would be conventional. After playing the message, the system returns to step 450 again.

If the operator does not make any selections from the display of FIG. 12a and an appropriate time out is reached at step 470, the terminal 90 will automatically transition back to the terminal state 400 at step 462.

Figure 13:
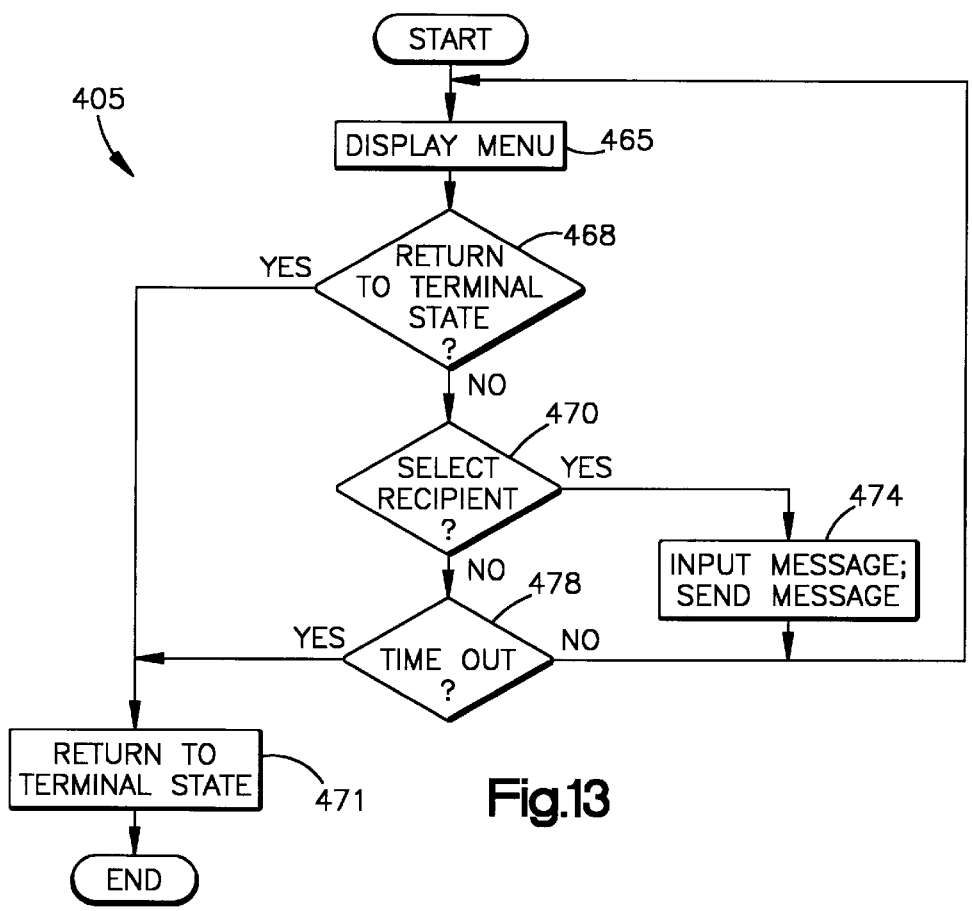
FIG. 13 is a flowchart illustrating the operation of the portable data terminal having voice messaging capabilities in a voice mail send state.
Figure 14:
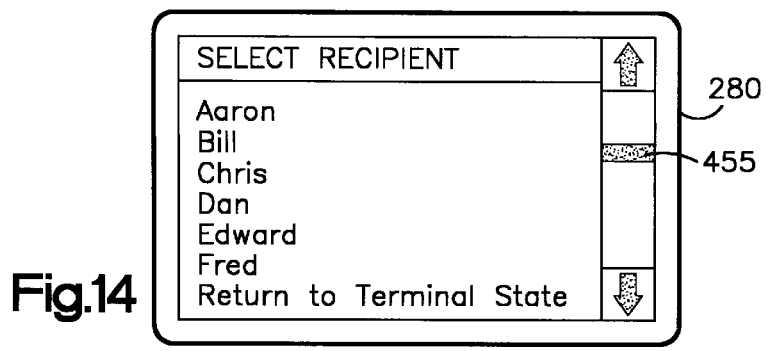
FIG. 14 is an exemplary menu provided on a display of the portable data terminal having voice messaging capabilities when in an initiate telephone call state or voice mail send state in accordance with the present invention.

FIG. 13 shows a flow chart of operation of the terminal 90 in the voice mail send state 405. At step 465, the voice mail send menu of FIG. 14 is displayed on the display screen. The messaging program allocates a portion of memory 330 to a table which stores the network addresses of the various devices (e.g., other terminals 90 with which the operator of the terminal 90 may want to send voice messages. The table also includes "nicknames" associated with the corresponding network addresses. For example, the first name of the operator of a given terminal 90 is stored together with the network address of the terminal 90. The display 280 of FIG. 14 displays the nickname of each possible recipient.

The network addresses stored in the memory 330 may be obtained using conventional wireless network techniques and/or be programmed into the terminal 90. The corresponding nicknames may be exchanged by including such data during an initialization routine in order that each terminal 90 transmits information regarding its nickname in combination with its network address.

If at 468 the operator selects to return to the terminal state 400, the terminal 90 returns to the terminal state 400 at step 471 via transition T4. If at step 468 the operator does not decide to return to the terminal state 400, the terminal 90 proceeds to step 470. If in step 470 the operator selects to send a voice mail message, the system advances to step 474 which represents input of the message via the microphone 298 (FIG. 8) and transmission of the message to the intended recipient. Typically, the voice messaging program will be designed to prompt the user via the display 280 to transaxially push the thumb wheel switch 300 to enter the message in an intuitive "push to talk" manner. During the time which the switch is depressed, the output of the microphone 298 is digitized and compressed by the audio controller circuit 350 in the manner described above. The compressed voice data is stored temporarily by in the memory 330. Upon the release of the switch 300, indicating the end of the recording of the voice mail message, the processor 325, in accordance with the voice messaging program, accesses the compressed voice data and forwards the digital data to the RF communication circuitry for transmission to the access point and subsequent transmission to the intended recipient.

Following step 474, the terminal 90 returns to step 465 in case the operator wishes to send another voice mail message. If in step 470, the operator has not selected a recipient of a voice message, the terminal 90 continues to step 478. If at step 478 the operator has not made a selection within a time out period, the system will automatically transition back to the terminal state 400 at step 471.

In an alternative embodiment of the invention, the operator may choose to broadcast a voice mail message to two or more recipients. For example, in step 470 of FIG. 13 the operator may select more than one recipient by depressing the switch 300 transaxially once each time the cursor 455 is beside an intended recipient. The voice messaging program is programmed to interpret such switch action as the selection of the corresponding recipient, and the processor 325 highlights each of the selected recipients on the display 280. Upon selecting each of the desired recipients, the operator depresses the switch 300 twice in rapid succession to indicate completion of the recipient selection process. The system then proceeds to step 474 as discussed above. However, in this embodiment, the voice messaging program must send the message to each of the intended recipients.

Initiating a Voice Messaging Conversation

Figure 15:
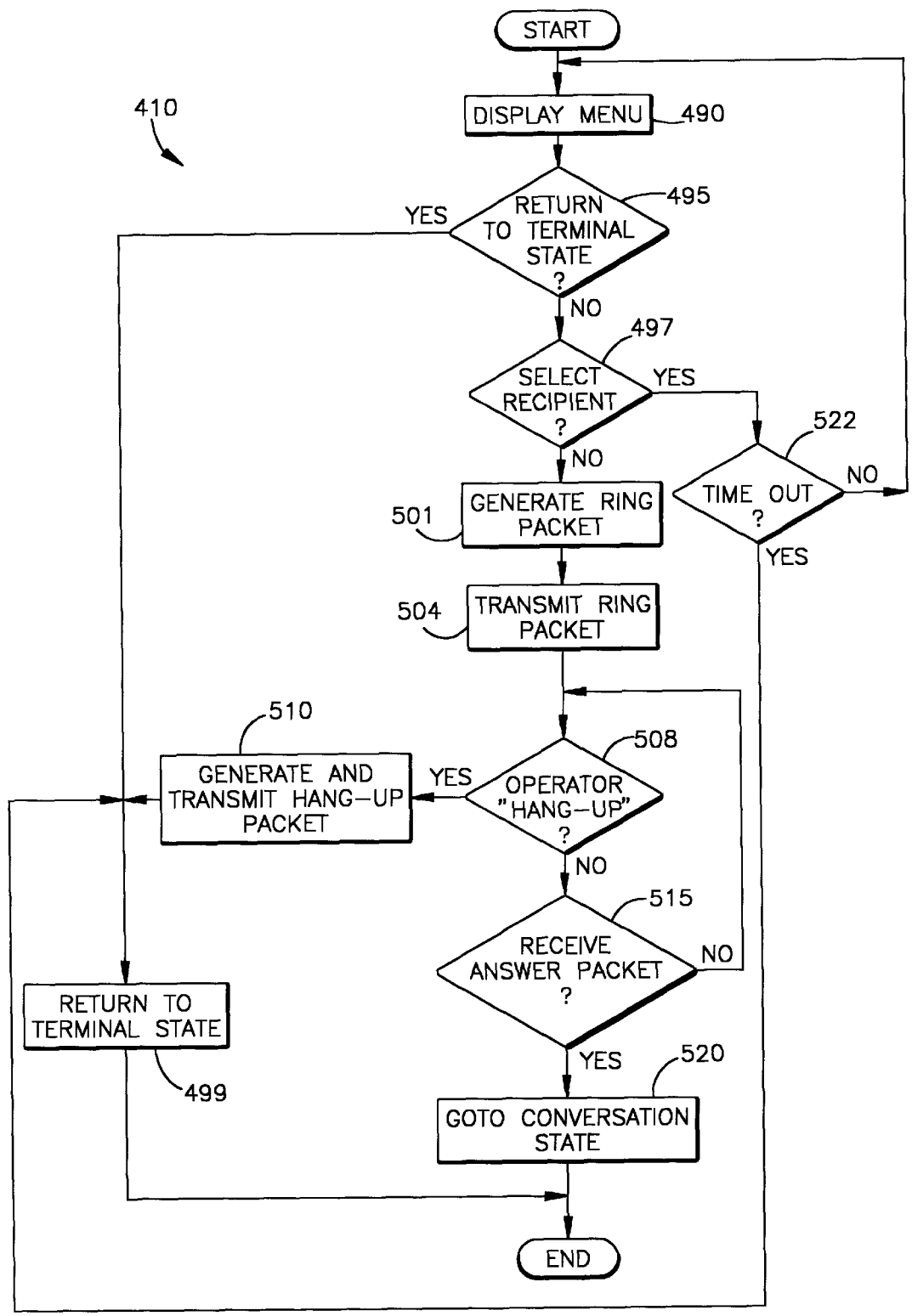
FIG. 15 is a flowchart illustrating the operation of the portable data terminal having voice messaging capabilities in an initiate telephone call state.

FIG. 15 represents operation of the terminal 90 in the initiate voice messaging conversation state 410. The operator may cause the terminal 90 to transition from the terminal state 400 to the initiate conversation state 410 by depressing the switch 300 transaxially once. The processor 325 detects such switch action and causes the terminal 90 to transition to the initiate telephone call state 410 (transition T7). Beginning in step 490, the processor 325 causes the display 280 to display the menu of possible recipients as represented in FIG. 14. If the operator selects the option on the display to return to the terminal state 400 as determined in step 495, the processor 325 returns to the terminal state 400 (transition T8) as represented at step 499.

If the operator does not elect to return to the terminal state 400 in step 495, the processor 325 proceeds to step 497 in which it determines if the operator selects one of the possible recipients shown on the display 280 with which to initiate a voice messaging conversation. If the processor 325 detects a selection based on a pressing of the switch 300 transaxially when the cursor 455 is adjacent the desired recipient, the processor 325 proceeds to step 501. In step 501, the processor 325 generates a "ring" packet 355 to be transmitted by the RF transceiver 315 to the selected recipient via the network 10. Such ring packet 355 includes a ring field indicator 360 (FIG. 9) to indicate to the device receiving the packet that the device transmitting the packet wishes to initiate a voice messaging conversation. The header field 356 of the ring packet includes the address of the terminal 14 transmitting the packet as the source address. The destination address of the ring packet 355 includes the network address corresponding to the recipient selected on the display 280 (as represented by the corresponding nickname). Step 504 represents sending the ring packet to the selected recipient via the RF transceiver 315.

Next, in step 508 the processor 325 determines if the operator of the terminal 90 has requested a "hang-up" (i.e., a request to terminate the initiation of the voice message conversation before the recipient answered). Specifically, if after step 504 the operator depresses the switch 300 once while still in the initiate conversation state 410, the processor 325 detects such switch action in step 508. As a result, the processor 325 then proceeds to generate and transmit a "hang-up packet" 130 in step 510. A hang-up packet is a packet 333 which includes the hang-up field indicator 362 (FIG. 9) informing the receiving device that the call attempting to be initiated is being terminated by the initiating device. The receiving devices such as other terminals 90 are programmed to transition from the receive request for voice messaging conversation state 413 to the terminal state 400 upon receipt of a hang-up packet 355 (transition T10).

The hang-up packet 355 generated in step 510 includes the network address of the terminal 90 as its source address, and the network address of the recipient selected in step 497 as the destination address.

If the operator does not hang-up as determined in step 508, the processor 325 proceeds to step 515 in which it determines if the terminal 90 has received an "answer packet" 355 via the RF transceiver 315. An answer packet is a packet which includes an answer field indicator 361. As is discussed below, a device which receives a ring packet 355 is programmed to respond with an answer packet 355 in order to establish a voice messaging conversation. The device sending the answer packet 355 includes its network address as the source address and the network address of the device which sent the ring packet 355 as the destination address. In the event the terminal 90 which is initiating the conversation does not receive an answer packet as determined in step 515, the terminal 90 will continue to loop through steps 508 and 515. In this manner, the terminal 90 will remain in the initiate voice messaging conversation state 410 until the operator either "hangs-up" or an answer packet is received.

Upon receiving an answer packet as determined in step 515, the processor 325 causes the terminal 90 to transition to the conversation state 415 (transition T5) as represented by step 520. If in step 497 the operator does not select a recipient within a predetermined time-out period (e.g., ten seconds) as determined in step 522, the processor 325 will cause the terminal 90 to revert back to the terminal state 400 (also transition T8) via step 499 as shown.

Carrying on a Voice Messaging Conversation

Figure 16:
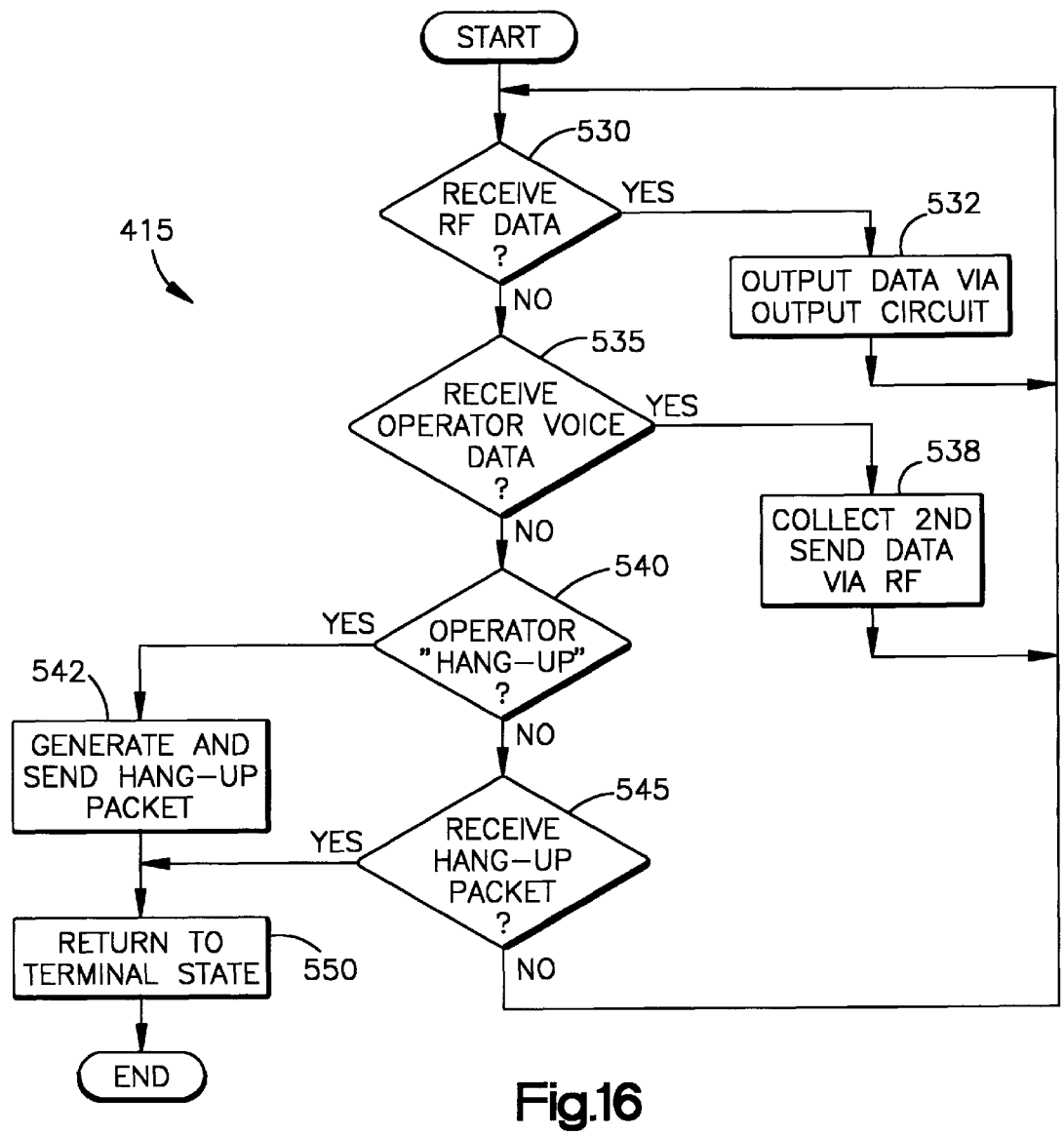
FIG. 16 is a flowchart illustrating the operation of the portable data terminal having voice messaging capabilities in a conversation state.

FIG. 16 represents the operation of the terminal 90 in the conversation state 415. Beginning in step 530, the processor 325 determines if the terminal 90 has received any packets 355 via the RF transceiver 315 which contain voice data in the voice field 359 (FIG. 9). If yes, such voice data is forwarded to the audio controller circuit 350. Specifically, the audio controller circuit 350 is used to decompress the voice data and convert it back to an analog signal which is then output to the operator via the speaker 293 as represented in step 532. Following step 532, the processor 325 returns to step 530.

If no voice data is received via the RF transceiver 315 as determined in step 530, the processor 325 proceeds to step 535. In step 535 the processor 325 prompts the user via the display 280 to speak into the microphone 298 while depressing and holding the switch 300 in a transaxial manner. The processor 325 detects such switch movement and the processor 325 proceeds to step 538 in which the terminal 90 collects the voice data from the operator as spoken into the microphone 298. Specifically, the processor 325 instructs the voice communication circuit 350 to digitize and compress the voice data provided by the operator during such time that the switch 300 remains depressed. The voice data is temporarily stored in the memory 330. Upon the operator releasing the switch 300 to indicate the end of the current recited statement, the processor 325 in step 538 generates one or more packets 355 containing the compressed voice data in the voice field 359 to be sent to the device with which the terminal 90 is corresponding. If the current recited statement is extremely lengthy, the processor may generate one or more packets 355 containing compressed data for a portion of the recited statement before the recited statement is complete.

In particular, the processor 325 generates one or more packets 355 containing the compressed voice data with a source address corresponding to the network address of the terminal 90. The destination address of the packet(s) 355 is the network address of the device with which the terminal 90 is communicating as identified by the prior exchange of ring and answer packets discussed above. In step 538, the processor 325 then provides the packets to the RF transceiver 315 for transmission to the receiving device. Following step 538, the processor 325 returns to step 530.

Steps 530 through 538 are repeated until such time as the conversation is terminated as determined in either step 540 or step 545. The steps are carried out in relative real time such that the voice conversation based on the exchange of packets containing compressed voice data resembles that of a conventional two-way radio conversation. Assuming there are no significant network delays in transmitting the packets 355 from their source to their destination, conversation will be audibly pleasing to the operators involved. Although the exchange of packets using the same RF transceiver 315 is not full duplex communication, the operators will soon become accustomed to the corresponding protocol based on the use of the switch 46 in a "push-to-talk" manner.

If in step 535 the processor 325 determines that operator voice data is not being provided, the processor 325 proceeds to step 220. In step 220, the processor 325 determines if the operator of the terminal 90 requests a hang-up (i.e., termination of the conversation). For example, in an exemplary embodiment if the operator depresses the switch 300 transaxially twice in rapid succession, the processor 325 is programmed to interpret such switch action as a request for a hang-up. In such case, the processor 325 proceeds from step 540 to step 542 in which the processor 325 generates and transmits a hang-up packet 355 in the same manner described above in relation to step 510 in FIG. 15. Following step 542, the processor 325 causes the terminal 90 to transition back to the terminal state 400 (transition T11) as represented by step 550.

If in step 540 the processor 325 determines that the operator has not requested a "hang-up", the processor 325 proceeds to step 545. In step 545 the processor 325 determines if a hang-up packet 355 has been received from the device with which the terminal 90 has been communicating (e.g., another terminal 90). Specifically, packets 355 received by the RF transceiver 315 are decoded and the processor 325 determines if such a hang-up packet with the hang-up field indicator 362 has been received. Such packet would be generated and transmitted, for example, by virtue of another terminal 90 with which the present terminal 90 was communicating proceeding to step 542 discussed above. If such a hang-up packet 355 is received as determined in step 545, the processor 325 causes the terminal 90 to return to the terminal state 400 (also transition T11) as represented by step 550. Otherwise, the processor 325 proceeds from step 545 back to step 530 where the above described process is repeated.

Accordingly, a voice messaging conversational from a terminal 90 to another device, such as another terminal 90, is initiated similar to a conventional telephone call where a desired recipient is selected and effectively "dialed" by sending a "ring" packet 355. The connection is established by the generation of an "answer" packet 355 by the called device. Thereafter, communications occur in a "push-to-talk" format similar to that used in citizen band radio or with walkie-talkies, for example. The push to talk call is then terminated similar to a conventional telephone call by one of the devices "hanging-up".

In another embodiment, step 535 in the conversation state is carried out substantially continuously. Namely, the voice communication circuit 350 continuously digitizing and compressing the output of the microphone 293. The compressed digitized output is then periodically transmitted in step 538, by the RF transceiver 315, in the voice field 359 of packets 355 every few seconds, for example. While the advantage of such embodiment is that it eliminates the "push-to-talk" requirements and better emulates a conventional telephone call, it increases the amount of packet traffic being routed through the access points 12 and the rest of the network 10.

Entering a Voice Messaging Conversation initiated by Another Terminal

Figure 17:
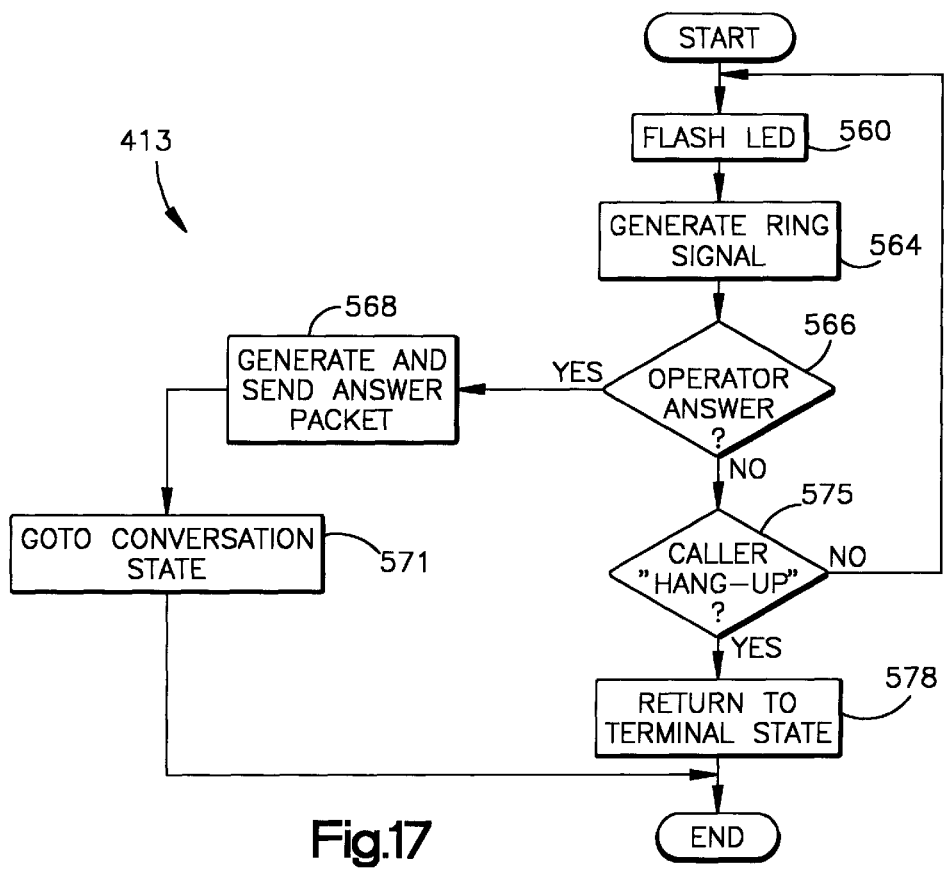
FIG. 17 is a flowchart illustrating the operation of the portable data terminal having voice messaging capabilities in a receive telephone call state.

FIG. 17 illustrates the operation of a terminal 90 when initially receiving a request for a voice messaging conversation. As mentioned above, the terminal 90 will ordinarily be in the terminal state 400. The processor 325 is programmed to detect when a ring packet 355 is received via the RF transceiver 315, the ring packet 355 including a ring field indicator 360 (see, FIG. 15; steps 501, 504 discussed above). Upon receiving such a ring packet 355, the processor 325 causes the terminal 90 to transition from the terminal state 400 to the receive request for a voice messaging conversation state 413 (transition T9).

Referring to FIG. 17, the receive request for a voice messaging conversation state 413 begins with step 560 in which the processor 325 causes the LED 322 to flash intermittently to indicate receipt of a request. Following step 560, the processor 325 proceeds to step 564 in which the processor 325 instructs the audio communication circuit 350 to generate a ring signal which is sounded via the speaker 293 to audibly indicate receipt. For example, the audio communication circuit 350 may retrieve from the memory 330 data representing a digitized ringing sound. Such data is input to the audio communication circuit 350 which decompresses the data and outputs an analog ringing signal to the speaker 293.

Following step 564, the processor 325 proceeds to step 566 in which it determines if the operator of the terminal 90 has answered the incoming request. Specifically, the processor 325 is programmed to detect whether the operator depresses the switch 300 transaxially once upon the terminal entering the receive voice messaging conversation state 413. The processor 325 is programmed to interpret such switch action as an "answering" of the call by the operator. Hence, if the processor 325 detects such switch action in step 566, the processor 325 proceeds to step 568.

In step 568, the processor 325 generates and transmits an "answer" packet. Specifically, the processor 325 generates a packet 355 which includes the answer field indicator 361 (FIG. 9). The source address of the answer packet is the network address of the terminal 90. The destination address of the answer packet is the network address of the device which sent the ring packet. The identity and network address of such device may be obtained by the processor 325 from the header information included in the ring packet. Following step 368, the processor 325 causes the terminal 90 to transition to the conversation state 415 (transition T6) as represented by step 571.

If in step 566 the operator does not answer by depressing the switch 300, due to unavailability for example, the processor 325 proceeds to step 571. In step 275 the processor 325 determines if a hang-up packet 355 has been received via the RF transceiver 315 from the device initiating the request. As is discussed above in relation to steps 508 and 510 of FIG. 15, a device may terminate a request prior to a conversation being established by transmitting a hang-up packet 355. If a hang-up packet 355 is received as detected by the processor 325 based on the presence of an indicator in the hang-up field 362 (FIG. 9), the processor 325 proceeds to step 578. In step 578 the processor 325 causes the terminal 90 to transition back to the terminal state 400 (transition T10). If, on the other hand, the terminal 90 does not receive a hang-up packet 355 as determined in step 575, the processor 325 returns to step 560 and the above described steps are repeated.

According to another embodiment, steps 568 and 571 may be combined in the sense that the operator of the device may want to include voice data in the "answer" packet 355 to begin the conversation. For example, in addition to including the answer field indicator 361, the "answer" packet 355 may include compressed digitized voice data input by the operator of the called device. While depressing the switch 300 transaxially to answer the request (step 566), the operator may hold the switch 300 in and speak into the microphone 298. As an example, the operator may recite "Hello, this is Tim". Upon releasing the switch 300, the converted voice data is included in the "answer" packet 355 which is sent in step 568. The requesting device, upon receiving the "answer" packet 355 (step 515; FIG. 15), converts the voice data included in the packet back to a voice signal which is output through the speaker 293 upon transitioning to the conversation state 415.

Multiple Party Voice Messaging Conversations

Another embodiment of the present invention provides for multiple party voice messaging conversations between three or more parties. Referring again to FIG. 15, the operator of a terminal 90 may wish to initiate conversation with two or more recipients. Thus, in step 497 the operator may select two or more recipients in the same manner discussed above in relation to broadcasting a voice mail message. Then, in step 501 the processor 325 generates a separate "ring" packet 355 destined for each of the recipients selected in step 497. The processor 325 then proceeds to transmit each of the "ring" packets in step 504 via the RF transceiver 315.

The ring packet 355 will cause each of the selected recipients, provided they are available, to respond with an "answer" packet 355 and transition to the conversation state (steps 568 and 571; FIG. 17). Upon receiving at least one "answer" packet 355, the calling terminal 90 transitions to the conversation state (steps 515 and 520; FIG. 15). In addition, the processor 325 in the calling terminal 90 is programmed to establish and maintain a list in memory 330 of the selected recipients which responded with an "answer" packet 355, or which subsequently sent a "hang-up" packet 355. As a result, the initiating terminal 90 maintains this list of active participants in the multiple party conversation.

The processor 325 within the initiating terminal 90 is programmed to include the network addresses of those participants which are currently active in a "conference address" field (not shown) of each packet 355 transmitted during the conversation state 400. The processor 325 is programmed to transmit packets 355 including voice data and the conference address information to each active participant during the conversation state 415 (steps 535 and 538; FIG. 16). The devices of the called recipients, on the other hand, are programmed to detect the addresses in the "conference address" field of each packet as part of step 532 (FIG. 16). The devices are then programmed to transmit separate packets 355 with their own voice data (steps 535 and 538) to each of the active participants as identified in the most recent "conference address" field. In this manner, the terminal 90 initiating the call and all the selected recipients can communicate with one another simultaneously. Upon the processor 325 of the initiating terminal 90 receiving a "hang-up" packet from the last of the selected recipients which had been active, the processor 325 causes the terminal 90 to transition back to the terminal state 400 (steps 545 and 550; FIG. 16).

If the operator of the initiating terminal 90 chooses to hang up in step 540 (FIG. 16) while one or more selected recipients remain active, the processor 325 proceeds to step 542. In this embodiment, the processor 325 causes a "hang-up" packet 355 to be transmitted via the RF transceiver 315 to each of the active recipients. Thus, each of the active recipients is returned to its terminal state. In this context, the initiating terminal 90 may unilaterally terminate the entire conference call by hanging up.

Accordingly, the present embodiment provides a portable data terminal which is capable of sending/receiving voice mail and/or carrying out voice messaging communications within a data collection network. The data terminal is able to transmit and receive voice communications using the same RF transceiver and routing protocols as used for communicating conventional data within the network. It is not necessary to utilize commercial cellular telephone services.

In another embodiment of the network 10 the host computer 16 or another network device is used to store voice mail messages for the respective terminals 90 rather than the messages being stored locally in the corresponding terminal 90. In such embodiment, packets 355 containing voice mail data are transmitted by the terminals 90 to the host computer 16. Each packet includes a tag identifying the particular device (e.g., another terminal 90) for which the voice mail message is intended. Each terminal 90 is then programmed to poll the host computer 16 periodically in order to retrieve the voice mail packets which may have been received by the host computer 16 for the particular terminal 90.

Portable Network Telephones

Figure 18:
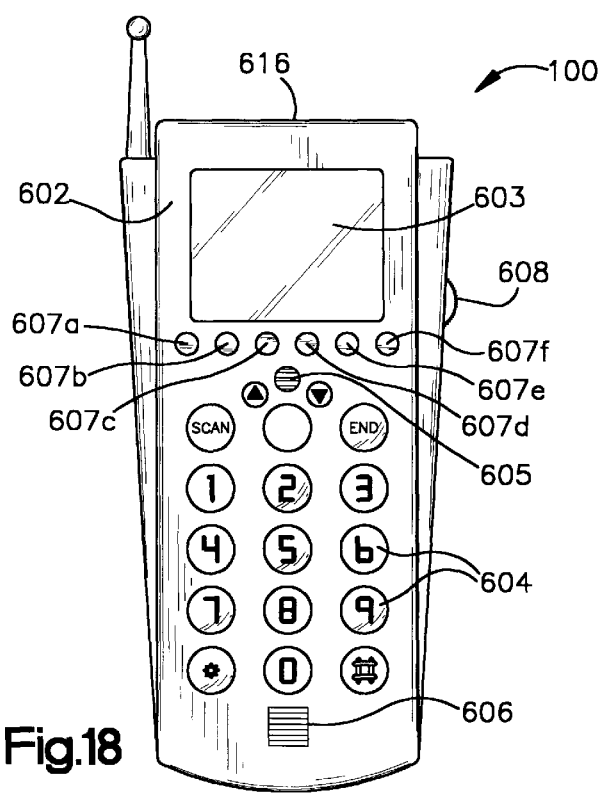
FIG. 18 is a front plan view of a portable network telephone in accordance with the present invention.

FIG. 18 shows a top view of a portable network telephone 100 in accordance with the present embodiment. The portable network telephone 100 includes a housing 602 which is shaped to comfortable fit in the palm of an operator's hand. Disposed on the housing is a display screen 603, a keypad 604, a speaker grate 605 and a microphone grate 606. As discussed in more detail below, the keypad 604 includes standard characters and numbers found on a conventional telephone keypad and also includes a plurality of dedicated keys 607a, 607b, 607c, 607d, 607e, and 607f the functions of which are described in more detail below. Further, the portable network telephone 100 includes a thumb wheel 608 which serves to perform many of the functions of switch 300 described above with respect to the portable data terminals 90.

Figure 19:
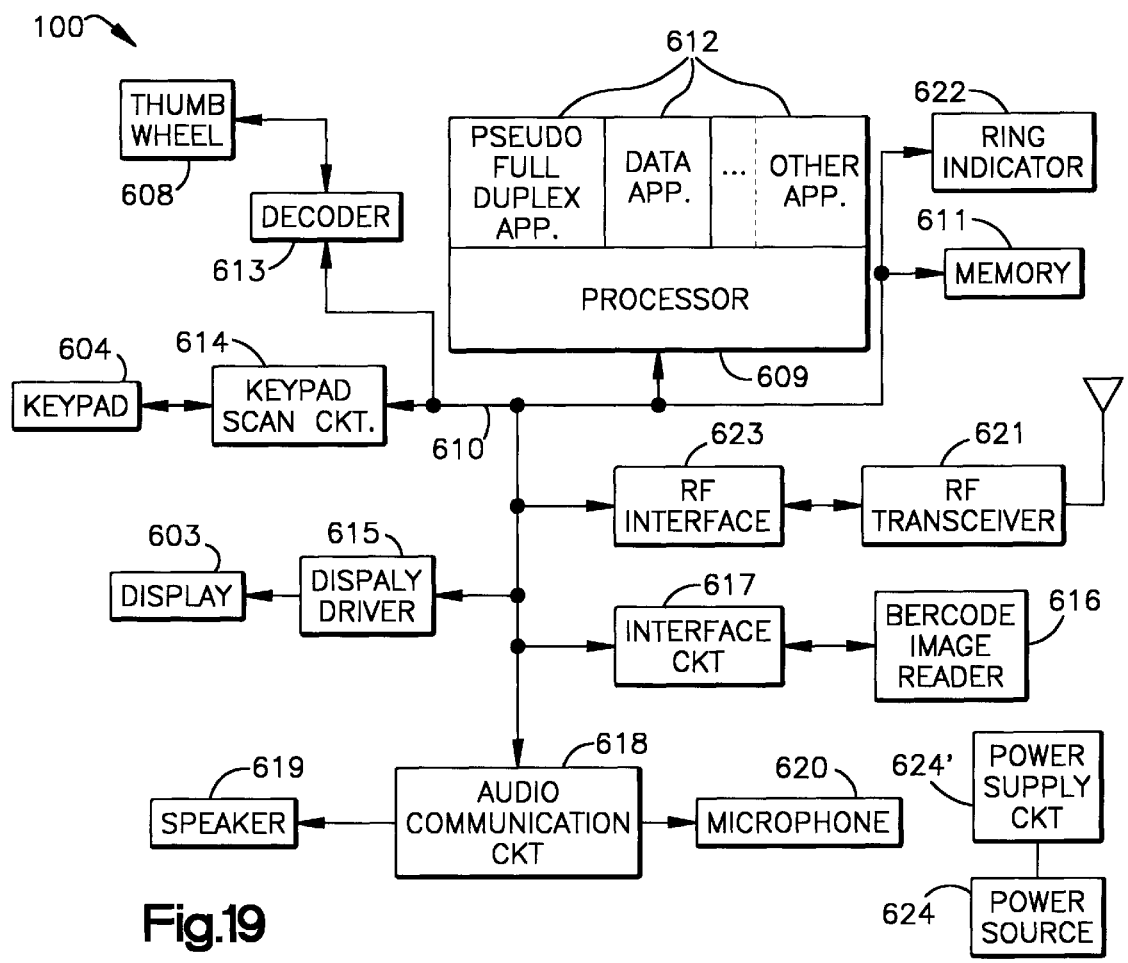
FIG. 19 is an electrical block diagram of the portable network telephone in accordance with the present invention.

As best seen in FIG. 19, the portable network telephone 100 includes a processor 609 for controlling the operations of the portable network telephone 100. The processor 609 of the present embodiment is of a type which can simultaneously run multiple application programs to allow for multi-tasking. The processor 609 may, for example, be a StrongArm SA1100 RISC processor commercially available from Intel Corporation. Coupled to the processor 609 via bus 610 is a memory 611 for storing program code executed by the processor 609 and for storing other data and information as described herein. For example, in the present embodiment, the memory 611 stores a pseudo full duplex audio communication program and a data communication program both of which may be simultaneously executed by the processor 609 as described in more detail below. Further, the processor 609 may execute other application programs as shown by blocks 612 which represent those application programs currently running by the processor 609.

Coupled to the bus 610 via decoder 613 is the thumb wheel 608. The decoder 613 may be any suitable circuit for providing an output to the processor 609 indicative of whether the thumb wheel 608 is being rotated clockwise, counterclockwise, or being depressed transaxially. The keypad 604 is coupled to the bus 610 through key pad scan circuit 614 which serves to scan the keypad to 604 to determine if a key is depressed. The display 603 is also coupled to the bus 610 via a display driver 615 which serves to control the pixels displayed on the display in accordance with instructions received from the processor 609.

A 1D bar code reader 616 is coupled to the bus 610 via an interface circuit 617. The interface circuit 617 includes a decode chip capable of decoding 1D bar codes such as that commercially available from ID Technologies of Brea, Calif. The bar code reader 616 may, for example, be a 1D-laser scanner commercially available from Symbol Technologies of Holtsville, N.Y. or PSC Inc. of Rochester N.Y. Alternatively, the bar code reader 616 may be a 2D-imaging device such as those commercially available from Metanetics Corporation of Bothel, Washington or Welch Allyn Corp. of Skaneatelas, N.Y. In such a case, the interface circuitry 617 includes circuit for generating a digital grayscale representation of the amount of reflected light illuminated on each pixel of the bar code reader 616 as is known in the art.

Also included within the portable network telephone 100 is audio communication circuitry 618, speaker 619, and microphone 620. The audio communication circuitry 618 serves to compress and decompress audio signals in a manner similar to that described above with respect to the RF data terminal 90. The speaker 619 and microphone 620 allow an operator to both transmit and receive audio information via an RF transceiver 621 coupled to the bus 610 through an RF interface 623 such as a PCMCIA controller. Further, the portable network telephone 100 includes a ring indicator circuitry 622 which is coupled to the bus 610 and configured to initiate periodic vibrations and/or audio rings until either the operator of the incoming portable network telephone 100 answers the call or the initiating device ends the call attempt. Power is supplied to the portable network telephone 100 via power source 624 and power supply circuitry 624'.

The present embodiment utilizes a pseudo full duplex audio communication protocol in the wireless network 10 to enhance the speed, relative timing, and delivery of audio or voice packets thereby substantially mimicking real-time full-duplex audio communications. In particular, a pseudo full duplex audio communication program is loaded in memory 611 of each portable network telephone 100 which provides for all audio communication to be routed through the gateway 25 as described in more detail below. Further, the pseudo full duplex communication application program ensures that audio packets are formatted in accordance with an industry standard protocol such as TCP/IP. Such formatted packets may then be be properly interpreted and routed by the gateway 25. A pseudo full duplex audio communication application program suitable for use with the present embodiment may, for instance, utilize the publicly available ITU H.323 protocol. Use of the pseudo full-duplex audio communication protocol eliminates the need for an operator to push a button to transmit audio messages to another device such as portable network telephone 100 and thus allows for a fluent exchange of audio communication.

In addition to audio communication, the portable network telephones 100 are also configured to send and receive data typically related to an application or task being performed by the portable network telephone 100. For instance, in a retail or manufacturing environment, the portable network telephones 100 may be utilized to read a bar code associated with a product and transmit decoded data from the bar code to the host computer 16 for inventory, pricing, or other purposes. Alternatively, an operator may decide to manually enter information into a portable network telephone 100 via keypad 604 for transmission to another device which may be either wirelessly or physically coupled to the backbone network 20. It will be appreciated that the portable network telephones 100 of the present embodiment may maintain an active pseudo full duplex audio communication session with one device using, for example, the ITU H.232 protocol while also actively transmitting or receiving data with another device as is discussed in more detail below. Thus, for example, it is not necessary that a portable network telephone 100a end a telephonic session with portable network telephone 100b in order for portable network telephone 100a to transmit decoded bar code data to the host computer 16 (FIG. 1).

Figure 20A:
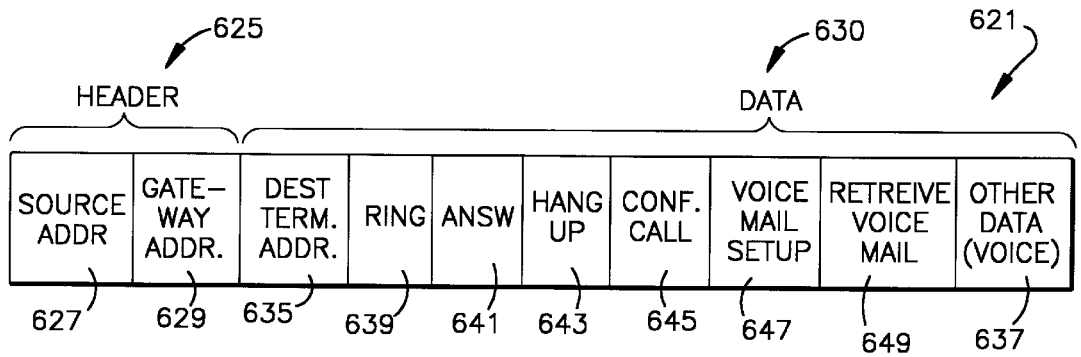
FIG. 20A is an exemplary portable network telephone packet format for transmitting voice information in accordance with the present invention.
Figure 20B:
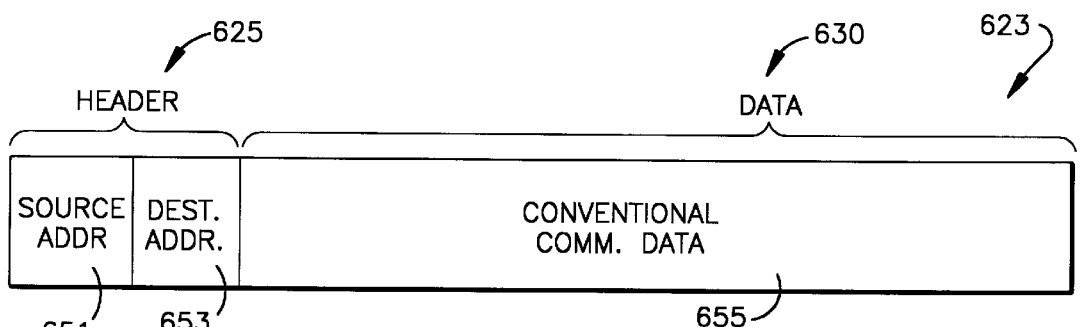
FIG. 20B is an exemplary portable network telephone packet format for transmitting conventional data in accordance with the present invention.

Referring now to FIGS. 20A and 20B, the general format for an audio or voice packet 621 and data packet 623 transmitted between various devices in the network 10 is shown. As discussed above with reference to the packet format shown in FIG. 9, each packet conventionally includes both a header portion 625 and a data portion 630.

The header portion 625 of the voice packet 621 shown in FIG. 20A includes as its source address 627, the address of the portable network telephone 100 transmitting the voice packet. Further, the header portion 625 of the voice packet 621 includes as its destination address 629, the address of the gateway 25 so that all voice packets are automatically routed to the gateway 25 for further processing. The data portion 630 of the voice packet includes a destination terminal code, or telephone number, field 635 indicating to the gateway 25 the device with which the portable network telephone 100 desires to communicate using a pseudo full duplex audio communication mode. A voice field 637 includes compressed digitized voice data to be transmitted to the receiving device. Furthermore, the data portion 630 of the voice packet 621 includes a ring field 639, an answer field 641, a hang-up field 643, a conference call field 645 a voice mail set-up field 647, and a retrieve voice mail field 649. As is discussed in more detail below, the ring field 639 is set to a binary "1" when a portable network telephone 100 desires to transmit a call initiation packet to the gateway 25 to enter into a telephonic session with another device. The answer field 641 is set to a binary "1" when a receiving portable network telephone 100 acknowledges to the gateway 25 that an operator has answered a call initiation request and started a telephonic session. The hang-up field is set to a binary "1" when an operator of either the call initiating telephone 100 or the call receiving telephone 100 has terminated an active telephonic session. The conference call field is set to a binary "1" when the information contained in a voice packet 621 contains a destination address of another device to be conferenced into an existing telephonic session. The voice mail set-up field is set to a binary "1" when the information contained in a voice packet contains a new outgoing message to be stored in the gateway voice mail table 694. Finally, the retrieve voice mail field is set to a binary "1" when an operator desires to prompt the gateway to retrieve any new or stored messages from the voice mail table 694. In all other cases, the respective fields 639, 641, 643, 645, 647, and 649 are set to a binary "0".

The data packet 623 of FIG. 20B is configured in a conventional format as is known in the art. Thus, the header portion 625 of the data packet includes as its source address 651, the address of the telephone 100 transmitting data and as its destination address 653, the address of the device with which the portable network telephone 100 desires to communicate. As data packets 623 of the present embodiment are not routed through the gateway 25, the destination address of the gateway 25 is not included in the header 625. The data portion 630 of the data packet 623 includes conventional data information 651. It will be appreciated, that both voice packets 621 and data packets 623 may also include error correction and other conventional fields as is known in the art.

Figure 20C:
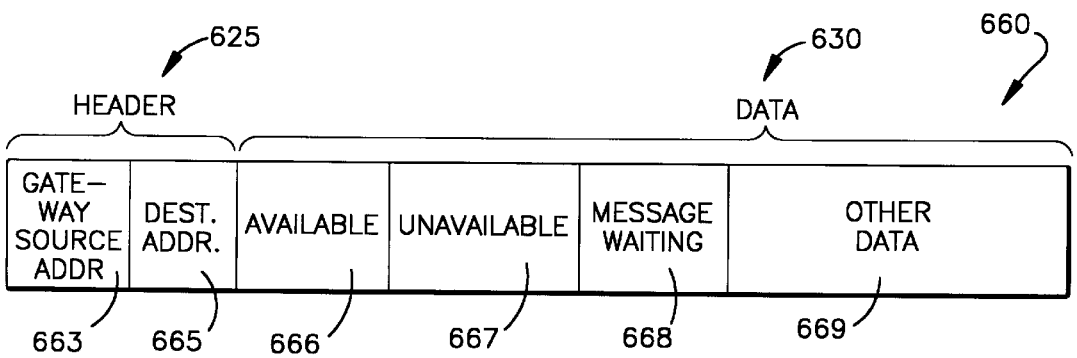
FIG. 20C is an exemplary gateway packet format for transmitting information in accordance with the present invention.

Referring now to FIG. 20C, a general format of a gateway packet 660 which is transmitted from the gateway 25 to other devices such as portable network telephones 15 is shown. As with the voice and data packets 621, 623, the gateway packet 660 includes a header portion 625 and a data portion 630. The header portion 625 of the gateway packet 660 includes as its source address 663 the address of the gateway 25 and as its destination address 665, the address of the device with which the gateway desires to transmit a packet. The data portion of the gateway packet 660 includes several control fields including a device available field 666, a device unavailable filed 667, and a message waiting field 668. Further, the gateway packet 660 includes a data field 669. When a device such as a portable network telephone 100 receives a packet from the gateway 25 in which the device available field 666 is set to a binary "1" the device receiving the packet knows that a device with which it desires to establish a telephonic session is available. Conversely, if the same device were to receive a packet from the gateway 25 in which the device unavailable field 667 were set to a binary "1", the device receiving the packet knows that the device with which it desires to establish a telephonic session is unavailable. Finally, if the gateway 25 transmits a packet to a device with the message waiting field 669 set to a binary "1" the receiving device would know that there were one or more new messages available at the gateway 25 for retrieval.

Figure 21A:
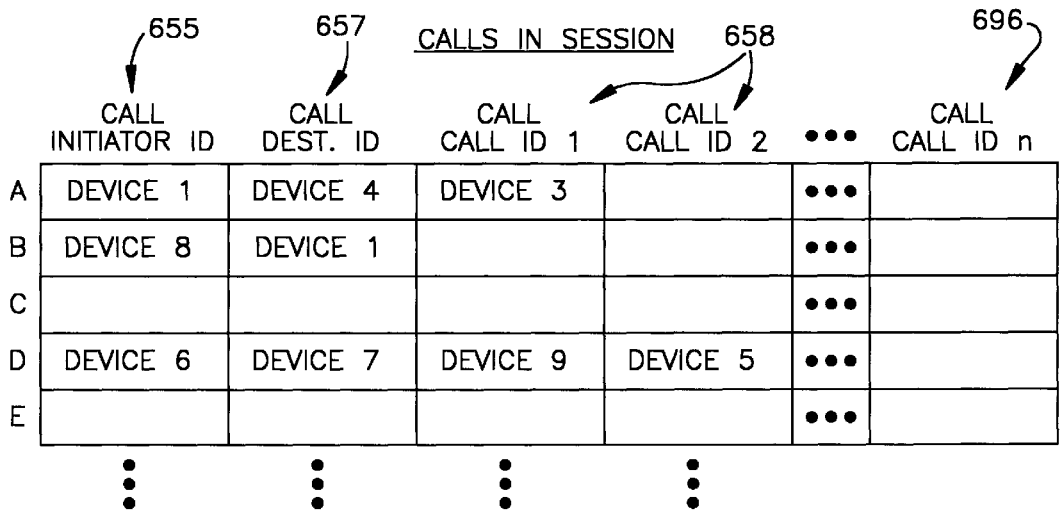
FIG. 21A is an exemplary look-up table of the gateway of FIG. 11 showing which calls are currently in session.

Referring now to FIG. 21 A, a look-up table 696 stored in memory 611 of the gateway 25 is shown in more detail. As briefly discussed above, the look-up table 696 serves to allow the gateway 25 to maintain a list of all portable network telephones 100 currently engaged in an active telephonic session. In this manner, the gateway 25 is able to efficiently determine if a given portable network telephone 100 is available to begin a new telephonic session with another device which has initiated a call request and/or determine if a device is available to be conferenced into an existing telephonic session. Thus, as shown in FIG. 21A, the look-up table 696 includes a call initiator ID field 655, a call destination ID field 657 and 1-n conference ID's 658 of devices conferenced into a telephonic session (where "n" equals the maximum number of callers supported by the gateway 25). Each row (i.e. rows A–E) of the table 296 represents devices currently engaged in an active telephonic session. Upon either a portable network telephone 100 or other device of an active telephonic session hanging-up or otherwise terminating the session, the corresponding row of entries in the table 296 are cleared indicating the session has ended.

Figure 21B:
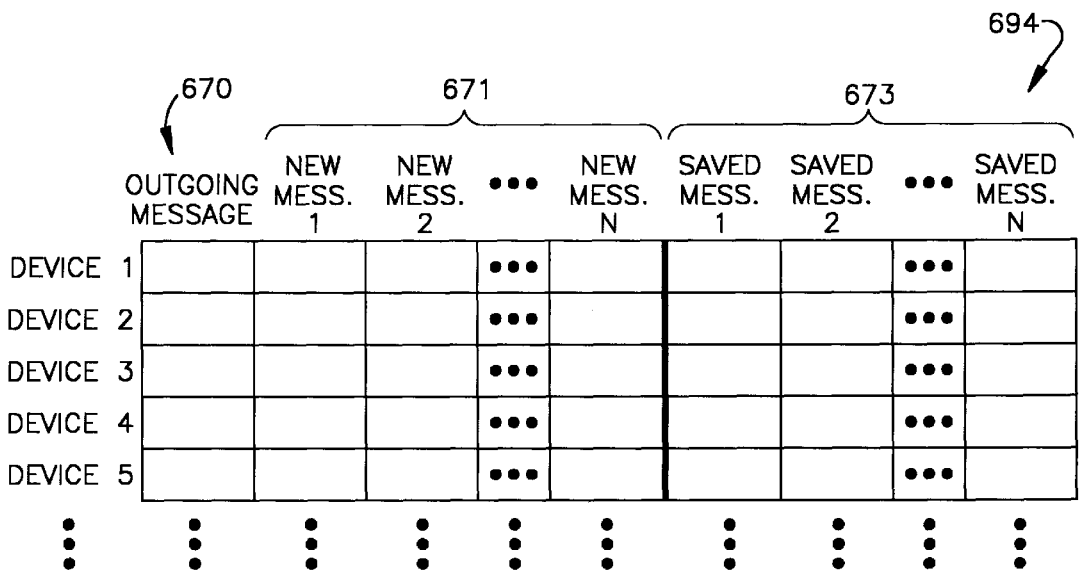
FIG. 21B is an exemplary voice mail table of the gateway of FIG. 11 showing which calls are currently in session.

Referring now to FIG. 21B, the gateway's voice mail table 694 stored in memory 611 is shown in more detail. The voice mail table 694 includes an entry for each device (i.e. devices 1-n) communicating in the system 10. For each device, the gateway 25 stores an outgoing message in outgoing message field 670, stores new messages in new message fields 671, and stores saved messages in saved message fields 673. In the present embodiment the gateway places a five minute time limit on any message to ensure sufficient memory is available in the gateway 25 to maintain operations. It will be appreciated, however, that no time limit need be set if sufficient memory is available. The outgoing message field 670 is defaulted to a prestored message generally indicating that the party trying to be reached is unavailable so please leave a message. As discussed in more detail below, the outgoing message field 670 may be personalized by an operator of any portable network telephone 100 or other device at any time.

Figure 22A:
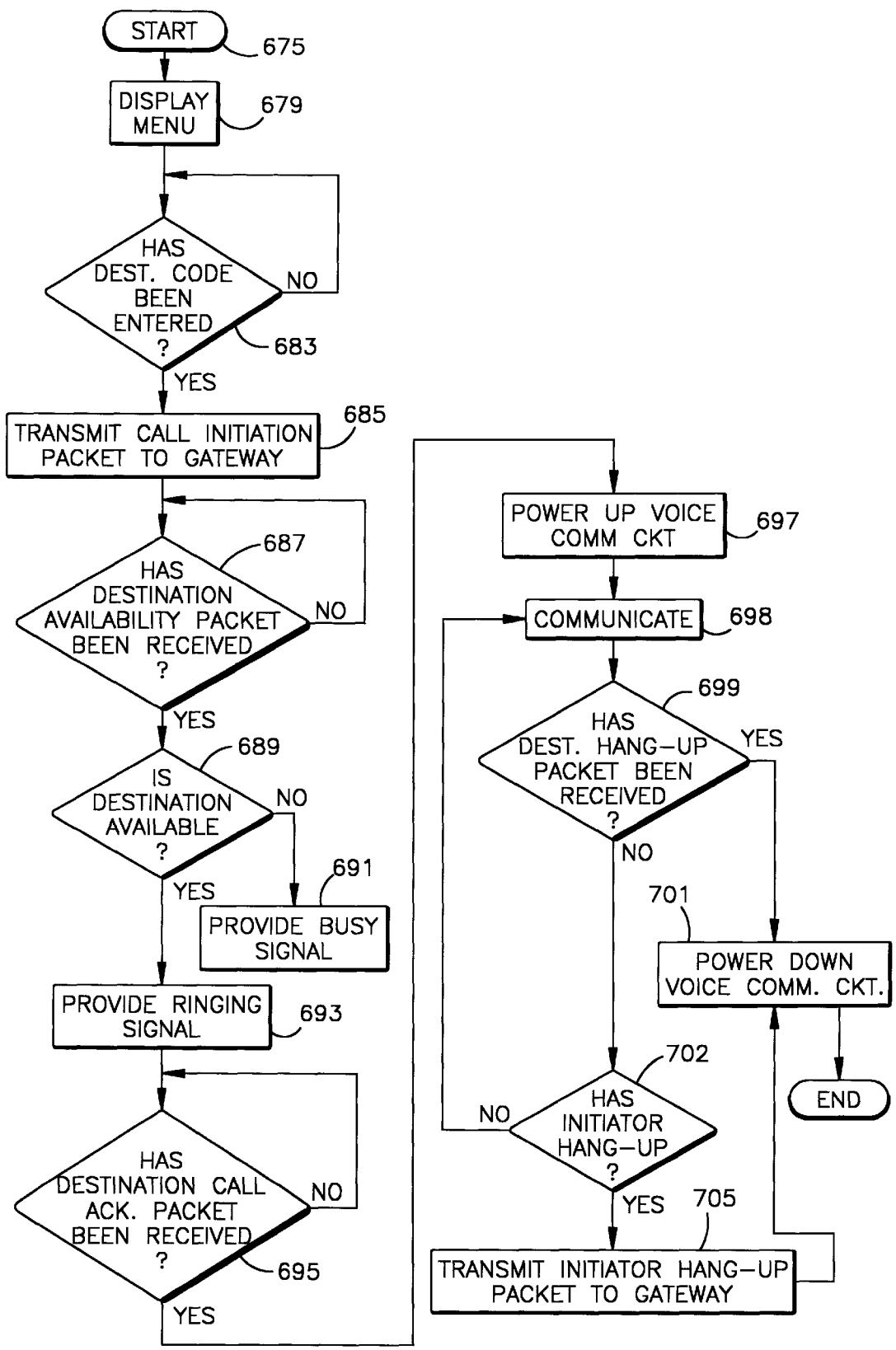
FIG. 22A is a flowchart illustrating the operation of a portable data terminal initiating a telephonic session in accordance with the present invention.

Referring now to FIG. 22A, the operation of a portable network telephone 100 initiating a telephonic session with a destination device in accordance with the present embodiment is shown. Beginning in step 675, a call initiation routine is entered into upon an operator pressing an audio communication key 607a on the portable network telephone 100 (FIG. 18). Once pressed, the processor 609 in step 679 displays a menu of dialing options on display screen 28 such as those described above with respect to FIG. 14. The operator may optionally enter a code or telephone number of a destination device by selecting a destination device from the menu options or by manually entering the code via the keypad. In step 683, the processor 609 determines if a destination code has been entered by the operator. If a destination code has not been entered, the processor 609 waits for an entry to be made and returns to step 683. If a destination code has been entered, the processor 609 proceeds to step 685.

In step 685, the initiating portable network telephone 100 transmits a call initiation packet to the gateway 25 by way of transmitting a voice packet 621 (FIG. 20A) having the ring field 639 set to "1" and indicating in the destination terminal. address field 635 the device with which the portable network telephone 100 desires to establish a telephonic session. The processor 609 then waits in step 687 for a destination availability packet from the gateway 25. The destination availability packet indicates to the initiating portable network telephone 100 whether the device with which the initiation portable network telephone 100 desires to enter into a telephonic session is currently available. If a destination availability packet is not received, the processor 609 continues to loop through step 687. Upon receiving the destination availability packet, the processor 609 continues to step 689 at which time the processor 609 determines whether to provide a busy signal or ringing signal to the operator through the initiating portable network telephone 100. Alternatively, as described in more detail below, if voice mail is setup in the gateway 25 for the destination device, then the gateway would provide an outgoing voice mail message rather than indicating to the initiating device to provide a busy signal. For purposes of this example, however, it will be assumed that voice mail is not setup of the destination device. Thus, if the destination availability packet indicates that the destination device is not available, the processor 609 continues to step 691 where a busy signal is provided to the operator through the portable network telephone 100. If, however, the destination availability packet indicates that the destination is available to enter into a telephonic session then the processor 609 continues to step 693 where a ringing signal is provided to the operator.

Next, the processor 609 continues to step 695 where it waits to receive a destination call acknowledgment packet from the gateway 25. The destination call acknowledgment packet indicates to the initiating portable network telephone 100 whether the operator of the destination device has accepted the initiation telephone's 100 request to enter into a telephonic session. If the destination call acknowledgment packet has not been received, the processor 609 returns to step 693 where the ringing signal continues to be provided. If, however, the destination call acknowledgment packet has been received, the processor 609 goes to step 697. In step 697, a telephonic session has been entered into between the initiating portable network telephone 100 and the destination device and thus the processor 609 powers up the audio communication circuitry 618 (FIG. 19). Once powered up, all audio signals received by the microphone 620 are automatically compressed, digitized and transmitted in voice packet 621 format to the gateway 25 for routing to the destination device. Thus, as depicted in step 698, following the power up routine, the processor 609 allows audio communication to occur until the telephonic session is terminated.

Figure 22B:
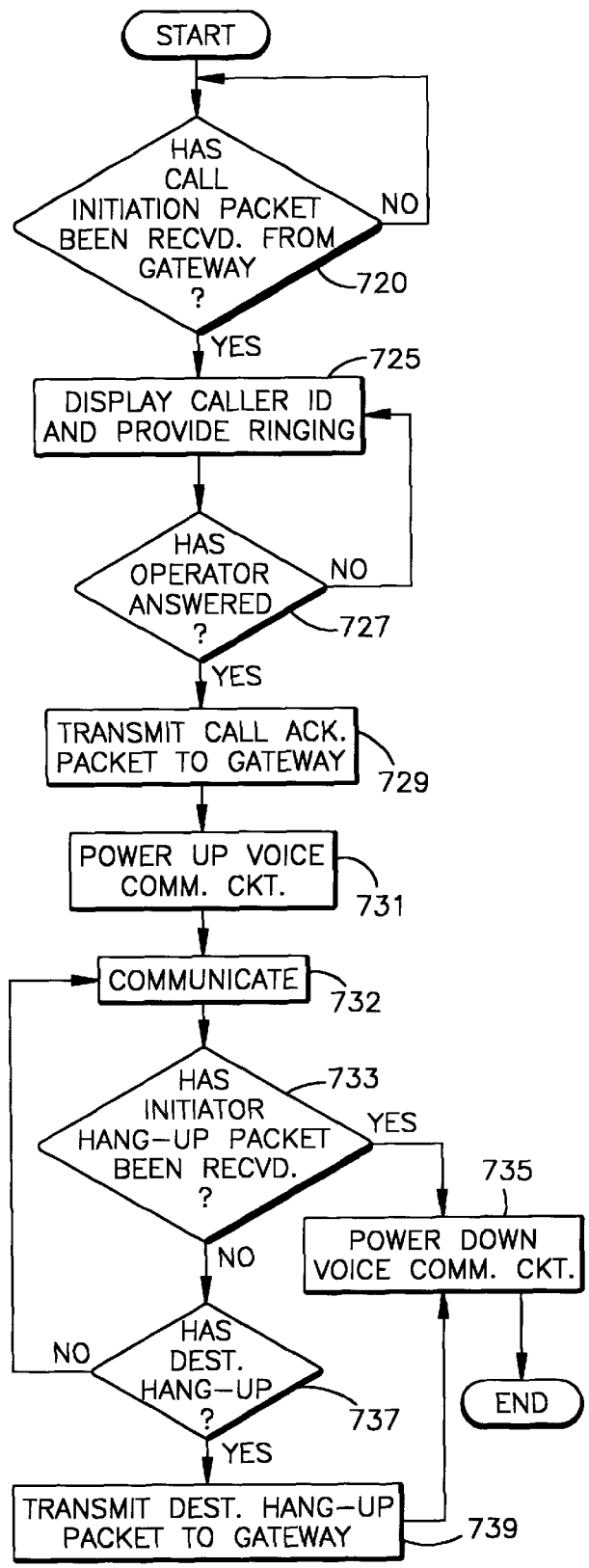
FIG. 22B is a flowchart illustrating the operation of a portable data terminal receiving a request to enter into a telephonic session in accordance with the present invention.

Once a telephonic session has commenced, the processor 609 in step 699 determines whether a destination hang-up packet has been forwarded to the initiating device from the gateway 25. The destination hang-up packet indicates to the initiating portable network telephone 100 that the operator of the destination device has hung-up or otherwise terminated the session. If a destination hang-up packet has been received, the processor 609 powers down the audio communication circuitry 618 in step 701 and ends this session. If, a destination hang-up packet has not been received, the processor 609 determines in step 703 if the operator of the initiating portable network telephone 100 has hung-up or otherwise initiated termination of the telephonic session. If the operator of the initiating portable network telephone 100 has not hung-up, the processor 609 continues to allow for audio communication to be transmitted and received via the gateway 25 and returns to step 698. If, however, the operator of the initiating portable network telephone 100 has hung-up by, for example, again pressing the audio communication key 607a (FIG. 18), the processor 609 continues to step 705. In step 705, the processor transmits a hang-up packet to the gateway 25 by way of transmitting a voice packet 621 having the hang-up field set to "1". Finally, the processor 609 proceeds to step 701 where the audio communication circuitry 618 is powered down. Referring now to FIG. 22B, the operation of a portable network telephone 100 serving as a destination device is shown. Beginning in step 720, the processor 609 determines whether a call initiation packet has been received from the gateway 25 indicating that another terminal desires to begin a telephonic session. If a call initiation packet is not received, the processor 609 loops back through step 720. If, however, a call initiation packet is received, the processor 609 continues to step 725. In step 725, the processor 609 provides a caller ID number of the initiating device in the display 28 if available. For instance, the telephone number of the initiating device received in the call initiation packet may be compared with a list of known ID names or numbers stored in memory 611 (FIG. 19), and if a match is found, the caller ID name and/or number may be displayed. Further, the processor 609 initiates the ring indicator circuitry 622 to provide either an audio or vibrational ring signal to the portable network telephone 100.

Next, in step 727 the processor 609 determines whether the operator of the portable network telephone 100 has answered the call. For instance, in the present embodiment, the operator answers the call by pressing the audio communication key 607a (FIG. 18). If the processor 609 determines that the call has not been answered, the processor 609 returns to step 725. If, on the other hand, the processor 609 senses that the call has been answered, the processor 609 proceeds to step 729. In step 729, the processor 609 transmits a call acknowledgment packet to the gateway 25 by way of transmitting a voice packet 621 having the answer field 641 set to "1". Next, in step 731, the processor 609 powers up the audio communication circuitry 618 (FIG. 19) and a pseudo full duplex telephonic session begins. During an active telephonic session, all audio communications received by the microphone 620 are compressed, digitized, and transmitted in voice packets 621 to the gateway 25 for routing to the initiating terminal. Thus, in step 732 the processor 609 is shown to be able to transmit and receive audio communication until the session is terminated.

Following commencement of an active telephonic session, the processor 609 proceeds to step 733 at which time the processor determines whether a hang-up packet has been forwarded from the gateway indicating that the operator of the initiating device has hung-up or otherwise terminated the session. If a hang-up packet is received, the processor 609 proceeds to step 735 wherein the audio communication circuitry 618 is powered down and the session ends. If a hang-up packet is not received, the processor 609 proceeds to step 737 where it is determined whether the operator of the destination portable network telephone 100 has hung-up by, for example, again pressing the audio communication key 607a (FIG. 18). If the operator of the destination portable network telephone 100 has not hung-up, the processor 609 continues to allow for audio communication through the gateway 25 and returns to step 732. If, however, the operator has hung-up, the processor 609 proceeds to step 739. In step 739, the processor 609 transmits a destination hang-up packet to the gateway 25 in the from of a voice packet 621 having the hang-up field 643 set to "1". Finally, the processor 609 continues to step 735 where the voice communication circuitry 76 is powered down and the session ends.

Figure 22C:
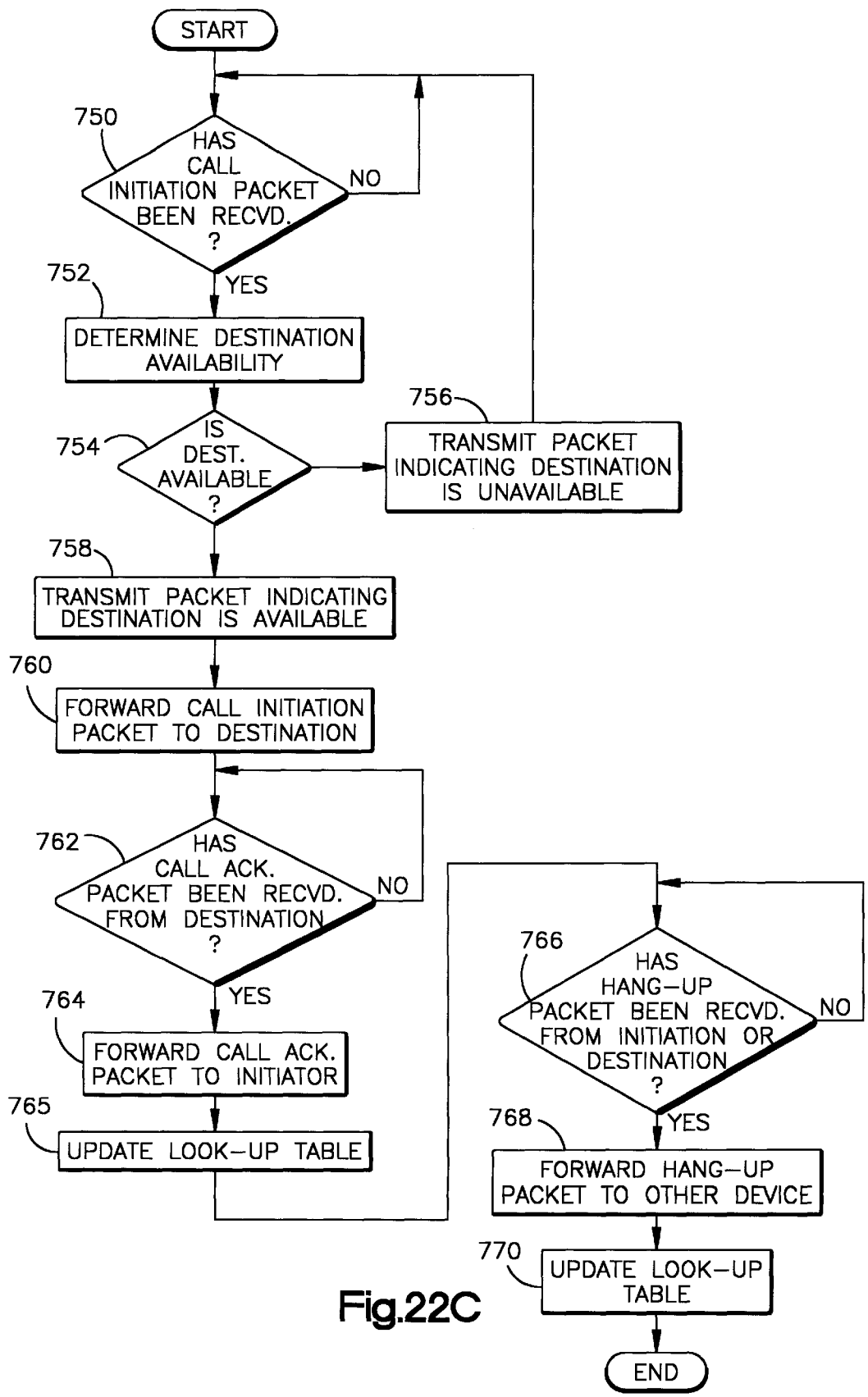
FIG. 22C is a flowchart illustrating the operation of the gateway in accordance with the present invention.

Referring now to FIG. 22C, the operation of the gateway 25 in accordance with the present embodiment is described in more detail. Beginning at step 750, the gateway processor 160 determines whether a call initiation packet has been received from portable network telephones 100 or an incoming call is received through the PBX. If a call initiation packet has not been received, the processor 160 loops back through step 750. If, however, a call initiation packet is received, the processor 160 proceeds to step 752. In step 752, the processor 160 compares the destination code included in the destination field 635 of the call initiation packet with the telephone numbers of all the devices listed in the look-up table 696 (FIG. 21a). If the destination terminal address is currently entered in the look-up table 696 then this terminal is currently in an active telephonic session with another terminal or device and thus is not available for a new telephonic session. If the destination terminal address in not entered in the look-up table 696 then the destination terminal is available for a new telephonic session. Thus, based on the current look-up table entries, the processor 160 in step 754 determines whether the destination terminal is available. If the destination terminal is not available, the processor 160 continues to step 756 where the processor 160 transmits a packet to the initiating terminal indicating that the destination terminal is not available. Finally, the processor 160 returns to step 750. If, however, the destination terminal is available, the processor 160 instead proceeds to step 758 where it transmits a packet to the initiating terminal indicating that the destination terminal is available. Following step 758, the processor 160 proceeds to step 760 where the call initiation packet received by the gateway 25 is forwarded to the destination portable network telephone 100.

Next, in step 762, the processor 160 determines whether a call acknowledgment packet has been received from the destination terminal indicating that the operator of the destination terminal has answered the call. If a call acknowledgment packet is not received, the processor 160 returns to step 762. If, however, a call acknowledgment packet is received, the processor 160 proceeds to step 764 where the processor forwards the call acknowledgment packet to the initiating terminal. Following step 764, the processor 160 in step 765 enters the address of both the initiating terminal and the destination terminal in the look-up table 296. Next, in step 766, the processor 160 determines whether a hang-up packet is received from either one of the initiation terminal or the destination terminal. If, no hang-up packet is received, the processor 160 loops back to step 766. If, however, a hang-up packet is received, the processor 160 proceeds to step 768. In step 768, the processor 160 forwards the hang-up packet to the corresponding terminal currently in session with the terminal having transmitted the hang-up packet. Next, in step 770, the processor 160 removes the addresses of both the initiating and destination terminals from the look-up table 696 thereby ending the telephonic session.

Figure 23:
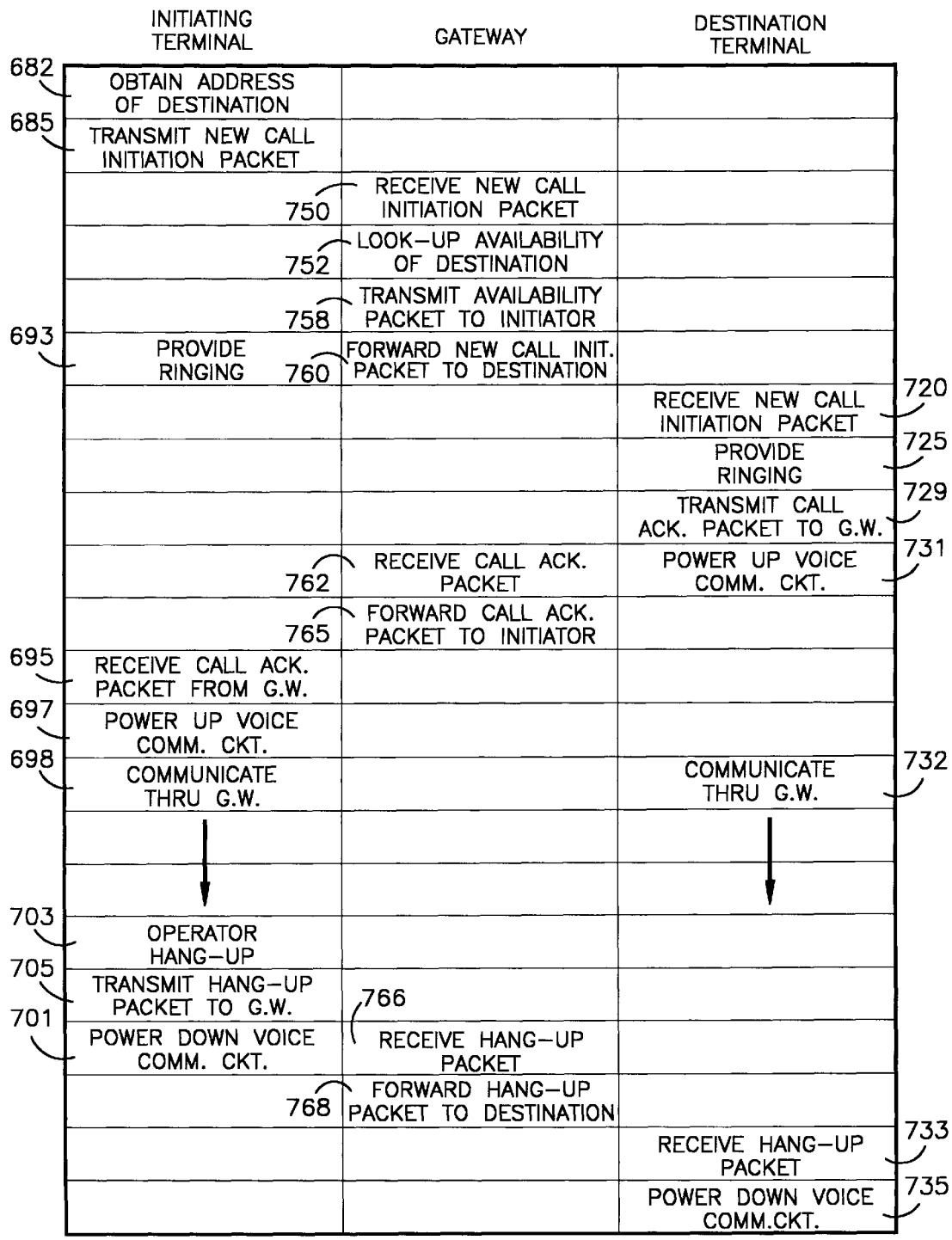
FIG. 23 is an exemplary chart showing the timing of events relating to a telephonic session in accordance with the present invention.

Referring now to FIG. 23, an example of the timings of the event described above with respect to FIGS. 22A–22C is depicted. More specifically, those events shown to co-exist on a same row occur at substantially the same time, while those events which are listed below a previous event occurs at a later time. The sequence of events listed in FIG. 23 relates to a case in which an initiating portable network telephone 100 is able to establish a telephonic session with a destination terminal and wherein an operator of the initiating terminal eventually hangs-up and ends the session. Each event referred to in FIG. 23 is referenced to a corresponding event in FIGS. 22A–22C.

Although the above discussions refer to an initiating terminal and destination terminal as two different devices, It will be appreciated, that a given portable network telephone 100 may serve as an initiating terminal in some instances and as a destination terminal in other instances. As discussed above, it will also be appreciated that the present embodiment provides for a given portable network telephone 100 currently in an active telephonic session to also communicate data packets 623 (FIG. 20B) to other devices in the network 10 without needing to end the telephonic session. More particularly, if during an active telephonic session, an operator of a portable network telephone 100 presses a bar code read button 607b or data communication button 607c (see FIG. 18), the portable network telephone 100 will toggle to a data communication mode. As the processor 609 of the portable network telephone 100 is able to run both voice and data communication programs simultaneously, the telephonic session does not need to end in order for the terminal to send data communication. Thus, during a data communication period, the telephonic session of the portable network telephone 100 remains active while the portable network telephone 100 may, for example, read a bar code and/or transmit and receive data packets 623 with other network devices such as the host computer 16. While voice data may not be communicated during this time, it will be appreciated that the operator has full control over when the portable network telephone 100 may enter or leave voice communication mode and in many instances will be able to transmit or receive pertinent information without a noticeable loss to the voice communication link.

Establishing a Conference Call

In order to establish a conference call, a device such as a portable network telephone 100 currently in an active telephonic session transmits a conference call packet to the gateway 25. More particularly, in the present embodiment, an operator establishes a conference call during an active telephonic session by pressing a "conference" key 607d (FIG. 18) on the keypad 604 followed by a code or telephone number of the device to which the operator desires to have conferenced into the current telephonic session. Following entry of the code, the operator again presses the "conference" key 607d at which point the processor 609 transmits a voice packet 671 to the gateway 25 having the conference call field 645 set to "1" and the code entered by the operator in the destination terminal address field 635 (FIG. 20A). After having pressed the "conference" key 607d the second time, the portable network telephone 100 initiating the conference call is temporarily unable to transmit or receive messages from the device (or devices) with which it is currently in an active telephonic session. In this way, the initiating portable network telephone can either establish communication with the party to be conferenced in or determine that the party to be conferenced in is not available. Once, the operator of initiating portable network telephone desires to return to the already established telephonic session, the operator again presses the "conference" key 607d. If the party to be conferenced in was available and answered, then upon pressing the "conference" key 607d, the party is added to the active telephonic session and all parties are now able to communicate with one another. If, however, the party to be conferenced in had not answered, then the original telephonic session continues without the additional party.

With respect to the gateway 25, upon receipt of the voice packet 671 indicating a conference call is desired, the gateway 25 performs substantially the same steps outlined in FIG. 22C to determine if the destination device is available and adds the destination device to the active telephonic session if it is available. More particularly, the processor 160 of the gateway substantially performs the same functions described with respect to steps 752–765 in FIG. 22C. It will be appreciated, however, that once a conference call is established with three or more devices, any one of the devices may transmit a hang-up packet without ending the telephonic session for the other devices which are in the active telephonic session.

Voice Mail Functions

As described above, the present embodiment further includes several voice mail functions which are accessed through the gateway 25.

Figure 24:
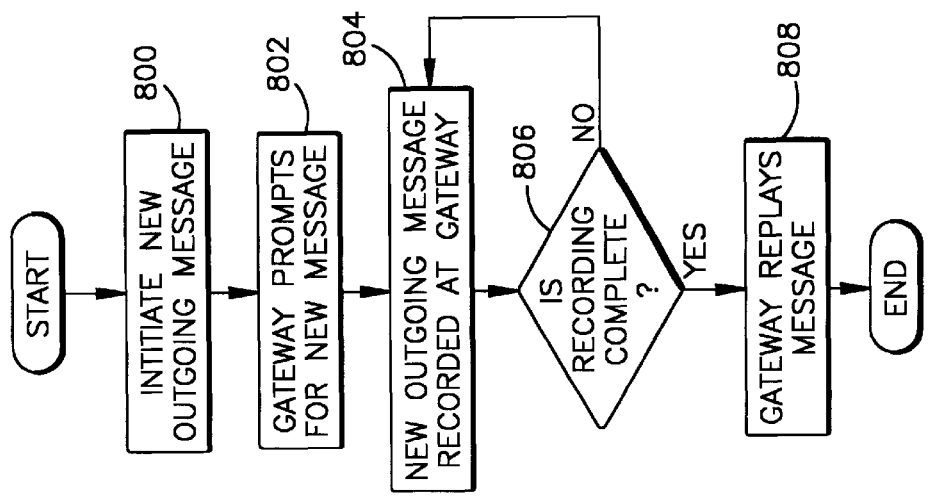
FIG. 24 is a flow chart illustrating the steps taken to change an outgoing message in the gateway in accordance with the present invention.

As discussed above, a default outgoing voice mail message is set up with respect to each device in the network 10. However, the present embodiment allows the default message to be personalized by each of the portable network telephones 100. More particularly, referring now to FIG. 24, in order to personalize the outgoing message of a particular portable network telephone 100, the operator of the telephone 100 initiates the change by pressing the change outgoing voice mail box key 607e (FIG. 18) indicated by step 800. Upon pressing key 607e, the processor 609 of the portable network telephone 100 transmits a voice packet to the gateway 25 in which the voice mail setup field 647 is set to "1". The gateway processor 160, in step 802, transmits a gateway packet 660 to the portable network telephone 100 indicating to begin the new outgoing message and press the key 607e when completed. Following this prompt, all of the audio communications sensed by the microphone 620 (FIG. 19) is transmitted to the gateway 25 and stored in the respective outgoing message field 670 as indicated in step 804. In step 806 the gateway processor 160 determines if the operator has finished recording as determined by the operator again pressing key 607e. If recording is not completed, the gateway processor 160 returns to step 804 where it continues to record the message. If the recording is completed, the new outgoing message is stored in the corresponding outgoing message column 670 of the voice mail table 694. Once stored, the gateway processor 160 in step 808 transmits gateway packets 660 back to the portable network telephone 100 which plays back the outgoing message to the operator to ensure the operator is satisfied with the stored outgoing message. If the operator desires to change the outgoing message, he/she may again press key 607e and re-record the outgoing message by staring at step 800.

Figure 25:
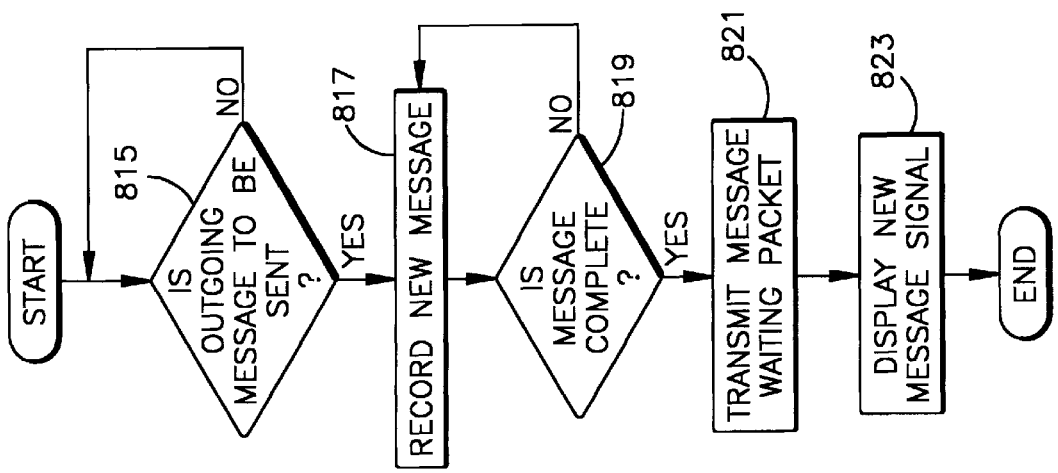
FIG. 25 is a flow chart illustrating the steps taken to send a message to be stored by the gateway in accordance with the present invention.

Referring now to FIG. 25, the gateway processor 160 in step 815 determines if an outgoing message is to be transmitted to an initiating device. In the present embodiment, the gateway processor 160 is configured to transmit an outgoing message if one of two conditions occur. First, the gateway processor 160 enters the destination device's voice mail box and transmits an outgoing message if the destination device attempting to be communicated with is currently in another active telephonic session (i.e. at step 756 of FIG. 22C). Secondly, the gateway processor 160 enters the destination device's voice mail box and transmits an outgoing message following a time out period during which an operator of the destination device which is not in an active telephonic session does not answer an incoming call (i.e. at step 762 of FIG. 22C). In the present embodiment, the time out period is set to approximate the time it would take for the destination device to receive at last four rings. It will be appreciated, however that the time out period may be set to any desired time out period and may be set differently for each portable network telephone 100. Thus, depending on whether one of the two conditions are met, the gateway processor 160 either proceeds to step 817 or loops back to step 815.

Following transmission of an outgoing voice mail message, the gateway processor 160 in step 817 is configured to receive and store as a new message 671 in voice mail table 694 (FIG. 21B) any audio communication received from the initiating portable network telephone 100.

In step 819 the gateway processor 160 determines if the message has ended as occurs if either the operator of the initiating portable network telephone 100 hangs up or a time out period is reached. If the message is not complete, the gateway processor 160 returns to step 817. If, however, the new message is complete, the gateway processor 160 continues to step 821. In step 821 a message waiting packet is sent by the gateway processor 160 to the destination portable network telephone 100 either immediately or following the destination portable network telephone 100 ending a telephonic session if currently within a session. More particularly, a gateway packet 660 is transmitted to the destination portable network telephone 100 having the message waiting field 668 set to "1". Upon receipt of the message waiting packet from the gateway 25, the processor 609 of the portable network telephone 100 in step 823 places a message waiting symbol in the display 603 indicating to the operator that a new message is available for retrieval.

Figure 26:
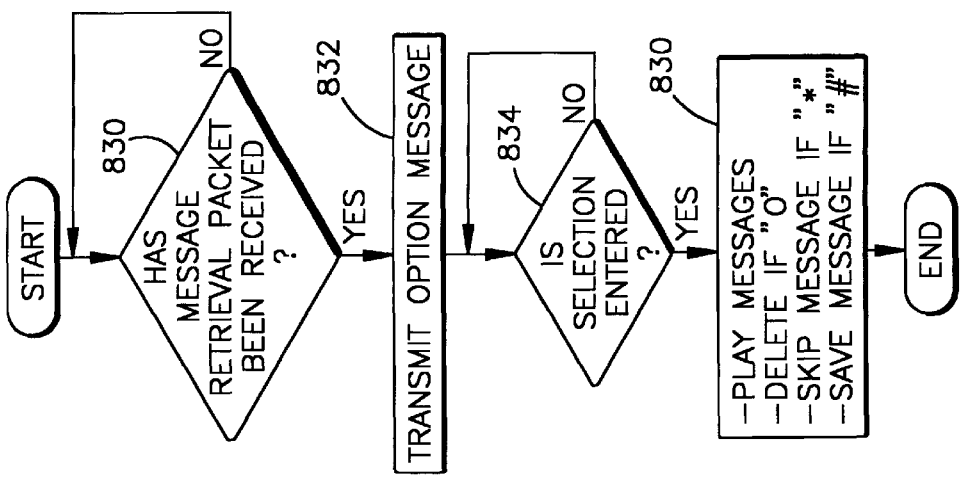
FIG. 26 is a flow chart illustrating the steps taken to retrieve a message from the gateway in accordance with the present invention.

Referring now to FIG. 26, a process for retrieving messages is in accordance with the present embodiment is shown. More particularly, in step 830 the gateway processor 160 determines if a message retrieval packet has been received. In order to retrieve a new message or listen to a saved message, an operator of the portable network telephone 100 presses the message retrieval key 607f (FIG. 18). Upon pressing the key 607f, the portable network telephone 100 transmits a voice packet 671 to the gateway having the retrieve voice mail field 649 set to "1". If no message retrieval packet is received, the gateway processor 160 returns to step 830. If, however, a message retrieval packet is received, the gateway processor 160 in step 832 transmits a series of gateway packets 660 to the portable network telephone prompting the operator to press "1" to listen to new message or press "2" to listen to saved messages. Following transmission of the message, the gateway processor 160 in step 834 determines if the operator of the portable network telephone 100 has entered a selection. If no selection is entered, the gateway processor 160 loops back to step 834. If, however a selection is entered and received by the gateway processor 160, the processor 160 continues to step 836. The operator enters his/her selection via the keypad 604 which is then transmitted as a voice packet 621 to the gateway 25. Depending on whether "1" or "2" was entered by the operator, the gateway 25 processor 160 in step 836 plays back new messages stored in new message columns 671 or saved messages stored in the save message columns 673 of the voice mail table 694. If, during playback, the operator desires to delete the message he/she may press the "0" key on the keypad 604 which prompts the gateway processor 160 to delete the current message from the voice mail table 694. Alternatively, if the operator desires to jump to the next message, the operator may press the key on the keypad 604 which prompts the gateway processor 160 to jump to the next message. If the operator desires to save a new message, he/she may press the "#" key on the keypad 604 which prompts the gateway processor 160 to move the new message from the new message column 671 to the next available saved message column 673 for that particular portable network telephone 100. By hanging-up, the operator may end the voice mail retrieval session at any time.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A wireless network including a backbone and a plurality of access points coupled to the backbone, the wireless network comprising:

a plurality of portable network telephones each including:
   a processor;
   at least one of a keypad and a barcode reader coupled to the processor for entry of data;
   audio communication circuitry coupled to the processor for converting audio communication between an analog and digital format; and an RF transceiver for wirelessly communicating the data and the audio communication with the backbone via one of the plurality of access points;

a host computer coupled to the backbone, wherein the host computer receives at least a portion of the data from the plurality of portable network telephones; and a gateway coupled to the backbone, wherein the gateway receives at least a portion of the audio communication and establishes a pseudo full duplex audio communication link between two or more of the plurality of portable network telephones;

wherein the gateway includes a memory for storing information relating to the plurality of portable network telephones.

2. The wireless network of claim 1, wherein the memory stores a table of portable network telephones that have established a pseudo full duplex audio communication link through the gateway.

3. The wireless network of claim 1, wherein the memory stores an outgoing message for at least one of the plurality of portable network telephones.

4. The wireless network of claim 1, wherein the memory stores at least one new voice mail message for at least one of the plurality of portable network telephones.

5. The wireless network of claim 4, wherein the memory stores the at least one new voice mail message as a saved message.

6. A wireless network including a backbone and a plurality of access points coupled to the backbone, the wireless network comprising:

a plurality of portable network telephones each including:
  a processor;
  at least one of a keypad and a barcode reader coupled to the processor for entry of data;
  audio communication circuitry coupled to the processor for converting audio communication between an analog and digital format; and
  an RF transceiver for wirelessly communicating the data and the audio communication with the backbone via one of the plurality of access points;

a host computer coupled to the backbone, wherein the host computer receives at least a portion of the data from the plurality of portable network telephones; and a gateway coupled to the backbone, wherein the gateway receives at least a portion of the audio communication and establishes a pseudo full duplex audio communication link between two or more of the plurality of portable network telephones;

wherein the gateway establishes a pseudo full duplex audio communication link among at least three of the plurality of portable network telephones.

7. The wireless network of claim 2, wherein the gateway transmits a destination unavailable packet to any of the plurality of portable network telephones attempting to establish a pseudo full duplex audio communication link with a portable network telephone listed in the table.

8. The wireless network of claim 2, wherein the gateway clears an entry of one of the plurality of portable network telephones from table upon receiving a hang-up packet from the one of the plurality of portable network telephones.

9. A portable network telephone for use in a wireless network including a backbone and a plurality of access points coupled to the backbone, the wireless network comprising a plurality of portable network telephones each including a processor, at least one of a keypad and a barcode reader coupled to the processor for entry of data, audio communication circuitry coupled to the processor for converting audio communication between an analog and digital format; and an RF transceiver for wirelessly communicating the data and the audio communication with the backbone via one of the plurality of access points; a host computer coupled to the backbone, wherein the host computer receives at least a portion of the data from the plurality of portable network telephones; a gateway coupled to the backbone, wherein the gateway receives at least a portion of the audio communication and establishes a pseudo full duplex audio communication link between two or more of the plurality of portable network telephones, said network telephone comprising:

a keypad for providing entry of a destination code representative of a destination device with which the portable network telephone desires to establish a pseudo full duplex audio communication link via the pseudo full duplex audio communication gateway and for providing entry of data for processing by the host computer;

a processor coupled to the keypad, the processor operative to distinguish between keypad entries representative of the destination code for transmission to the pseudo full duplex audio communication gateway and keypad entries representative of the data for transmission to the host computer; and an RF transceiver wirelessly communicating the data to the host computer and the destination code to the pseudo full duplex audio communication gateway in accordance with instructions from the processor.

10. The portable network telephone of claim 9, wherein the portable network telephone transitions into a active telephonic session mode upon receiving an acknowledge packet form the pseudo full duplex audio communication gateway indicating that the destination device has accepted a request from the portable network telephone to establish a full duplex audio.

11. The portable network telephone of claim 10, further including a means transmitting data via the RF transceiver while in the active telephonic session mode.

12. The portable network telephone of claim 9 further including a display for displaying data entered or received by the portable network telephone.

13. The portable network telephone of claim 12, further including circuitry of displaying a caller ID on the display of another portable network telephone desiring to enter into a pseudo full duplex audio communication link.

14. The portable network telephone of claim 9, further including ring indicator circuitry for providing a signal to an operator that another portable network telephone desires to enter into a pseudo full duplex audio communication link.

15. The portable network telephone of claim 14, where in the ring indicator circuitry provides at least one of periodic audible rings and period vibrations.

16. The portable network telephone of claim 9, further including a bar code reader coupled to the processor for automatic entry of data into the portable network telephone.

17. A method of conducting a telephonic session with a wireless network including a backbone and a plurality of access points coupled to the backbone, the wireless network comprising:

a plurality of portable network telephones each including:
  a processor;
  at least one of a keypad and a barcode reader coupled to the processor for entry of data;
  audio communication circuitry coupled to the processor for converting audio communication between an analog and digital format; and an RF transceiver for wirelessly communicating the data and the audio communication with the backbone via one of the plurality of access points;

a host computer coupled to the backbone, wherein the host computer receives at least a portion of the data from the plurality of portable network telephones; and a gateway coupled to the backbone, wherein the gateway receives at least a portion of the audio communication and establishes a pseudo full duplex audio communication link between two or more of the plurality of portable network telephones;

said method comprising the steps of:

establishing an active telephonic session between the first and second telephones via the pseudo full duplex audio communication gateway; and transmitting data from at least one of the first and second telephones to a host computer to during the active telephonic session;

wherein upon establishing an active telephonic session between the first and second telephones, the pseudo full duplex audio communication gateway enters an address of the first and second telephones in a table.

18. The method of claim 17, wherein upon receipt of the unavailable packet, the third portable network telephone activates circuitry providing a busy signal.

19. The method of claim 18, wherein upon receipt of the unavailable packet, the third portable network telephone activates circuitry providing a busy signal.

20. The method of claim 19, wherein the pseudo full duplex audio communication gateway clears the first and second portable network telephones from the table upon receiving a hang-up packet from at least one of the first and second portable network telephones.

21. The method of claim 20, wherein the pseudo full duplex audio communication gateway forwards the hang-up packet to the other of the first and second portable network telephone which did not transmit the hang-up packet.

22. A method of communicating with a wireless network including a backbone and a plurality of access points coupled to the backbone, the wireless network comprising:

a plurality of portable network telephones each including:
a processor;
at least one of a keypad and a barcode reader coupled to the processor for entry of data;
audio communication circuitry coupled to the processor for converting audio communication between an analog and digital format; and
an RF transceiver for wirelessly communicating the data and the audio communication with the backbone via one of the plurality of access points;

a host computer coupled to the backbone, wherein the host computer receives at least a portion of the data from the plurality of portable network telephones; and a gateway coupled to the backbone, wherein the gateway receives at least a portion of the audio communication and establishes a pseudo full duplex audio communication link between two or more of the plurality of portable network telephones;

said method comprising the steps of:

transmitting from the first portable network telephone audio communication for receipt by the second portable network telephone;

receiving the audio communication at a gateway coupled to the backbone, the gateway establishing a pseudo full duplex audio communication link between the first portable network telephone and the second portable network telephone; and forwarding the audio communication from the gateway to the second portable network telephone;

said method further comprising the steps of:

transmitting from one of the first portable network telephone and the second portable network telephone a request for a third portable network telephone to be included in the pseudo full duplex audio communication link established by the gateway; and establishing by the gateway a pseudo full duplex audio communication link with the first portable network telephone, the second portable network telephone, and the third portable network.

23. The method of claim 22, further comprising the step of:

storing at the gateway a voice mail message for the first portable network telephone.

24. The method of claim 23, further comprising the step of:

retrieving from the gateway by the first portable network telephone via the voice mail message.

* * * * *